US012278919B2

(12) United States Patent
Yang et al.

(10) Patent No.: US 12,278,919 B2
(45) Date of Patent: Apr. 15, 2025

(54) VOICE CALL METHOD AND APPARATUS, ELECTRONIC DEVICE, AND COMPUTER-READABLE STORAGE MEDIUM

(71) Applicant: Beijing Honor Device Co., Ltd., Beijing (CN)

(72) Inventors: Zhao Yang, Beijing (CN); Weibo Xiong, Beijing (CN); Song Lin, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 0 days.

(21) Appl. No.: 17/916,572

(22) PCT Filed: Apr. 21, 2022

(86) PCT No.: PCT/CN2022/088075
§ 371 (c)(1),
(2) Date: Oct. 1, 2022

(87) PCT Pub. No.: WO2022/242405
PCT Pub. Date: Nov. 24, 2022

(65) Prior Publication Data
US 2024/0223692 A1 Jul. 4, 2024

(30) Foreign Application Priority Data
May 19, 2021 (CN) .......................... 202110548502.8

(51) Int. Cl.
*H04M 1/72457* (2021.01)
*H04M 1/60* (2006.01)
*H04M 1/72454* (2021.01)

(52) U.S. Cl.
CPC ..... *H04M 1/72457* (2021.01); *H04M 1/6058* (2013.01); *H04M 1/72454* (2021.01)

(58) Field of Classification Search
CPC ........... H04M 1/72457; H04M 1/6058; H04M 1/72454; H04M 1/568; H04M 3/568; H04S 2400/11; H04S 2420/01; H04S 7/304
See application file for complete search history.

(56) References Cited

U.S. PATENT DOCUMENTS 7,120,469 B1 * 10/2006 Urakawa ........... H04M 1/27485
455/414.1
2015/0319296 A1 * 11/2015 Beyer, Jr. .............. H04W 4/021
455/456.6

(Continued)

FOREIGN PATENT DOCUMENTS

CN 104080047 A 10/2014
CN 105466416 A * 4/2016

(Continued)

*Primary Examiner* — Farid Seyedvosoghi
(74) *Attorney, Agent, or Firm* — WOMBLE BOND DICKINSON (US) LLP

(57) ABSTRACT

Embodiments of this application provide a voice call method and apparatus, and relate to the field of terminal technologies. The method includes: obtaining, by the first terminal device, azimuth information between the first terminal device and the second terminal device based on location information and orientation information of the first terminal device and location information of the second terminal device; and processing, by the first terminal device, a voice signal from the second terminal device based on the azimuth information to obtain a first-channel voice signal and a second-channel voice signal. Then, a first headphone may play the first-channel voice signal and the second-channel voice signal in a first channel and a second channel, respectively. In this way, a user can sense an azimuth status of a peer end during a voice call based on voice fed back by a headphone.

20 Claims, 21 Drawing Sheets

(56) References Cited

U.S. PATENT DOCUMENTS

2015/0373183 A1 12/2015 Woolsey et al.
2015/0373477 A1 12/2015 Norris et al.

FOREIGN PATENT DOCUMENTS

| CN | 107071192 A | * | 8/2017 |
| CN | 107301028 A | | 10/2017 |
| CN | 107360332 A | | 11/2017 |
| CN | 107580289 A | * | 1/2018 |
| CN | 108429858 A | | 8/2018 |
| CN | 108520760 A | | 9/2018 |
| CN | 113422868 A | | 9/2021 |

* cited by examiner

VOICE CALL METHOD AND APPARATUS, ELECTRONIC DEVICE, AND COMPUTER-READABLE STORAGE MEDIUM

This application is a national stage of International Application No. PCT/CN2022/088075, filed on Apr. 21, 2022, which claims priority to Chinese Patent Application No. 202110548502.8, filed on May 19, 2021. Both of the aforementioned applications are hereby incorporated by reference in their entireties.

TECHNICAL FIELD

This application relates to the field of terminal technologies, and in particular, to a voice call method and apparatus, an electronic device, and a computer-readable storage medium.

BACKGROUND

At present, with the development of terminal technologies, a terminal device has become a part of people's work and life. A terminal device-based voice call has generally become a mainstream manner of people's remote communication.

Generally, a terminal device may play clear voice based on a good network communication quality, and adjust a playback mode of the voice based on users' settings.

However, the voice call manner above is monotonous.

SUMMARY

Embodiments of this application provide a voice call method and apparatus, an electronic device, and a computer-readable storage medium, so that either party of a voice call can enhance a sense of the other party's location based on the voice call, thereby enriching content of the voice call.

According to a first aspect, an embodiment of this application provides a voice call method. The voice call method is applied to a voice call system, where the voice call system includes a first terminal device, a second terminal device, and a first headphone connected to the first terminal device. The method includes: sending, by the first terminal device, a first request to the second terminal device, where the first request is used to request location information of the second terminal device; sending, by the second terminal device, a first message to the first terminal device, where the first message contains the location information of the second terminal device; obtaining, by the first terminal device, azimuth information between the first terminal device and the second terminal device based on location information and orientation information of the first terminal device and the location information of the second terminal device; when the azimuth information indicates that the second terminal device is located at a first side of the first terminal device, processing, by the first terminal device, a voice signal from the second terminal device based on the azimuth information to obtain a first-channel voice signal and a second-channel voice signal; sending, by the first terminal device, the first-channel voice signal and the second-channel voice signal to a first channel and a second channel of the first headphone, respectively, where the first headphone includes a first earpiece and a second earpiece, the first earpiece corresponds to the first channel, and the second earpiece corresponds to the second channel; and playing, by the first headphone, the first-channel voice signal and the second-channel voice signal in the first channel and the second channel, respectively. In this way, a user can sense an azimuth status of a peer end during a voice call based on the voice signals fed back by the first headphone connected to the first terminal device, thereby enriching content of the voice call.

The azimuth information may include location information and direction information. The first-channel voice signal and the second-channel voice signal may be signals that correspond to two ears and onto which a voice cue is superposed.

In a possible implementation, the first side corresponds to the first channel of the first headphone, and a signal strength of the first-channel voice signal is greater than that of the second-channel voice signal. In this way, the user can sense the azimuth status of the peer end during the voice call based on the strengths of the voice signals fed back by the first headphone.

In a possible implementation, a time delay of the first-channel voice signal is less than that of the second-channel voice signal. In this way, the user can sense the azimuth status of the peer end during the voice call based on the time delays of the voice signals fed back by the first headphone.

In a possible implementation, before the sending, by the first terminal device, a first request to the second terminal device, the method further includes: displaying, by the first terminal device, a first interface, where the first interface is an interface used for calling the second terminal device, and includes a first control; receiving, by the first terminal device, a first operation of selecting the first control; and enabling, by the first terminal device, a first function in response to the first operation, where the first function is used to implement a positioning assist during a voice call. In this way, the user can select a positioning-assisted call mode before making a call. Therefore, when the peer end answers the call, the user can sense the azimuth status of the peer end based on voice having a sense of azimuth.

The first control may be a control used for implementing the first function. The first operation may be an operation of triggering the first control.

In a possible implementation, the first interface further displays a first pop-up window; and the first pop-up window displays, in a form of a list, the first control, a second control used for making a call, and a third control used for editing a number before calling the number.

In a possible implementation, the sending, by the second terminal device, a first message to the first terminal device includes: displaying, by the second terminal device, a second interface in response to the first request, where the second interface is an interface used for prompting a voice call, and includes a fourth control; and sending, by the second terminal device, the first message to the first terminal device when the second terminal device receives, within a first time threshold, a second operation of triggering the fourth control. In this way, when the user selects the positioning-assisted call mode before making the call, and the peer end accepts the call mode, the user can sense the azimuth status of the peer end based on the voice having the sense of azimuth.

The fourth control may be a control used for assisting in positioning during a voice call. The second operation may be an operation of triggering the fourth control.

In a possible implementation, the first message further includes orientation information of the second terminal device, and the sending, by the second terminal device, a first message to the first terminal device includes: displaying, by the second terminal device, a third interface in response to the second operation, where the third interface is used to determine an initial azimuth of the second terminal device, and displays a compass used for indicating an azimuth; receiving, by the second terminal device in the third interface, a third operation used for azimuth calibration; and sending, by the second terminal device, the first message to the first terminal device in response to the third operation. In this way, the second terminal device can determine an azimuth and an orientation of the second terminal device based on azimuth calibration. Then, the second terminal device can also determine an azimuth status of the first terminal device relative to the second terminal device based on the orientation information and the location information of the second terminal device and the location information of the first terminal device.

The third operation may be an operation of azimuth calibration based on the compass in the third interface.

In a possible implementation, the method further includes: displaying, by the second terminal device, first prompt information, where the first prompt information is used to prompt an applicable range of the first function. In this way, the prompted applicable range may be used to better implement a positioning assist function of a terminal device.

In a possible implementation, before the sending, by the first terminal device, a first request to the second terminal device, the method further includes: displaying, by the first terminal device, a fourth interface, where the fourth interface is an interface of a voice call, and includes a fifth control; receiving, by the first terminal device, a fourth operation of selecting the fifth control; and enabling, by the first terminal device, the first function in response to the fourth operation, where the first function is used to implement a positioning assist during a voice call. In this way, the user can request the second terminal device to enable a positioning assist function. When the second terminal device enables the positioning assist function, the user can sense the azimuth status of the peer end based on the voice having the sense of azimuth.

The fifth control may be used to implement the first function. The fourth operation may be an operation of triggering the fifth control.

In a possible implementation, the fourth interface further displays a sixth control used for recording, a seventh control used for voice on hold, the fifth control, an eighth control used for making a video call, a ninth control used for muting, and a tenth control used for viewing a contact.

In a possible implementation, the sending, by the second terminal device, a first message to the first terminal device includes: displaying, by the second terminal device, second prompt information in response to the first request, where the second prompt information includes an eleventh control and a twelfth control; and sending, by the second terminal device, the first message to the first terminal device when the second terminal device receives, within a second time threshold, a fifth operation of triggering the eleventh control. In this way, during the voice call, after the second terminal device accepts the request that is for the positioning assist and that is from the first terminal device, the first terminal device can determine an azimuth status between the two devices based on the location information of the second terminal device. Then, the user can sense the azimuth status of the peer end by using the first headphone connected to the first terminal device.

The eleventh control is used to allow the first function to be enabled during a voice call. The twelfth control is used to refuse to enable the first function during a voice call. The fifth operation is an operation of triggering the eleventh control and/or the twelfth control.

In a possible implementation, a voice call interface of the first terminal device further includes a thirteenth control, and the method further includes: receiving, by the first terminal device, a sixth operation of triggering the thirteenth control; and displaying, by the first terminal device, a map interface in the voice call interface in response to the sixth operation, where the map interface includes locations of the first terminal device and the second terminal device, and a route from the first terminal device to the second terminal device. In this way, during the voice call, the user can accurately sense specific azimuths of the user and the peer end based on a map function provided by the first terminal device.

The thirteenth control is used to view location statuses of the first terminal device and the second terminal device. The sixth operation may be an operation of triggering displaying of the map interface.

In a possible implementation, the processing, by the first terminal device, a voice signal from the second terminal device based on the azimuth information to obtain a first-channel voice signal and a second-channel voice signal includes: querying, by the first terminal device, a preset spatial cue library for a spatial cue corresponding to the azimuth information, where the spatial cue library includes a plurality of correspondences; any of the correspondences includes azimuth information and a spatial cue corresponding to the azimuth information; the spatial cue includes a binaural cue and a monoaural cue; the binaural cue is used to reflect a change of voice in a horizontal direction, and includes an interaural level difference (ILD) and an interaural time difference (ITD); and the monoaural cue is used to reflect a change of the voice in a vertical direction; mapping, by the first terminal device, the voice signal onto a first source signal corresponding to the first channel and a second source signal corresponding to the second channel; superposing, by the first terminal device, the ITD onto the second source signal to obtain a superposed second source signal; superposing, by the first terminal device, the ILD onto the first source signal to obtain a superposed first source signal; and generating, by the first terminal device, a filter coefficient by using the monoaural cue, and separately performing filtering on the superposed first source signal and the superposed second source signal based on the filter coefficient, to obtain the first-channel voice signal and the second-channel voice signal. In this way, during the voice call, the first terminal device can superpose the spatial cue onto the voice signal. Then, the user can receive voice having the sense of azimuth from the peer end by using the first headphone, and sense the azimuth status of the peer end.

According to a second aspect, an embodiment of this application provides a voice call method. A first terminal device is connected to a first headphone. The method includes: sending, by the first terminal device, a first request to a second terminal device, where the first request is used to request location information of the second terminal device; receiving, by the first terminal device, a first message sent by the second terminal device, where the first message contains the location information of the second terminal device; obtaining, by the first terminal device, azimuth information between the first terminal device and the second terminal device based on location information and orientation information of the first terminal device and the location information of the second terminal device; obtaining, by the first terminal device, the azimuth information between the first terminal device and the second terminal device based on the location information and the orientation information of the first terminal device and the location information of the second terminal device; processing, by the first terminal device, a voice signal from the second terminal device based on the azimuth information to obtain a first-channel voice signal and a second-channel voice signal; sending, by the first terminal device, the first-channel voice signal and the second-channel voice signal to a first channel and a second channel of the first headphone, respectively, where the first headphone includes a first earpiece and a second earpiece, the first earpiece corresponds to the first channel, and the second earpiece corresponds to the second channel; and playing, by the first headphone, the first-channel voice signal and the second-channel voice signal in the first channel and the second channel, respectively. In this way, a user can sense an azimuth status of a peer end during a voice call based on the voice signals fed back by the first headphone connected to the first terminal device, thereby enriching content of the voice call.

In a possible implementation, the first side corresponds to the first channel of the first headphone, and a signal strength of the first-channel voice signal is greater than that of the second-channel voice signal.

In a possible implementation, a time delay of the first-channel voice signal is less than that of the second-channel voice signal.

In a possible implementation, before the sending, by the first terminal device, a first request to the second terminal device, the method further includes: displaying, by the first terminal device, a first interface, where the first interface is an interface used for calling the second terminal device, and includes a first control; receiving, by the first terminal device, a first operation of selecting the first control; and enabling, by the first terminal device, a first function in response to the first operation, where the first function is used to implement a positioning assist during a voice call. In this way, the user can select a positioning-assisted call mode before making a call. Therefore, when the peer end answers the call, the user can sense the azimuth status of the peer end based on voice having a sense of azimuth.

In a possible implementation, the first interface further displays a first pop-up window; and the first pop-up window displays, in a form of a list, the first control, a second control used for making a call, and a third control used for editing a number before calling the number.

In a possible implementation, before the sending, by the first terminal device, a first request to the second terminal device, the method further includes: displaying, by the first terminal device, a fourth interface, where the fourth interface is an interface of a voice call, and includes a fifth control; receiving, by the first terminal device, a fourth operation of selecting the fifth control; and enabling, by the first terminal device, the first function in response to the fourth operation, where the first function is used to implement a positioning assist during a voice call. In this way, the user can request the second terminal device to enable a positioning assist function. When the second terminal device enables the positioning assist function, the user can sense the azimuth status of the peer end based on the voice having the sense of azimuth.

In a possible implementation, the fourth interface further displays a sixth control used for recording, a seventh control used for voice on hold, the fifth control, an eighth control used for making a video call, a ninth control used for muting, and a tenth control used for viewing a contact.

In a possible implementation, a voice call interface of the first terminal device further includes a thirteenth control, and the method further includes: receiving, by the first terminal device, a sixth operation of triggering the thirteenth control; and displaying, by the first terminal device, a map interface in the voice call interface in response to the sixth operation, where the map interface includes locations of the first terminal device and the second terminal device, and a route from the first terminal device to the second terminal device.

In a possible implementation, the processing, by the first terminal device, a voice signal from the second terminal device based on the azimuth information to obtain a first-channel voice signal and a second-channel voice signal includes: querying, by the first terminal device, a preset spatial cue library for a spatial cue corresponding to the azimuth information, where the spatial cue library includes a plurality of correspondences; any of the correspondences includes azimuth information and a spatial cue corresponding to the azimuth information; the spatial cue includes a binaural cue and a monoaural cue; the binaural cue is used to reflect a change of voice in a horizontal direction, and includes an interaural level difference (ILD) and an interaural time difference (ITD); and the monoaural cue is used to reflect a change of the voice in a vertical direction; mapping, by the first terminal device, the voice signal onto a first source signal corresponding to the first channel and a second source signal corresponding to the second channel; superposing, by the first terminal device, the ITD onto the second source signal to obtain a superposed second source signal; superposing, by the first terminal device, the ILD onto the first source signal to obtain a superposed first source signal; and generating, by the first terminal device, a filter coefficient by using the monoaural cue, and separately performing filtering on the superposed first source signal and the superposed second source signal based on the filter coefficient, to obtain the first-channel voice signal and the second-channel voice signal. In this way, during the voice call, after the second terminal device accepts the request that is for the positioning assist and that is from the first terminal device, the first terminal device can determine an azimuth status between the two devices based on the location information of the second terminal device. Then, the user can sense the azimuth status of the peer end by using the first headphone connected to the first terminal device.

According to a third aspect, an embodiment of this application provides a voice call method. The method includes: receiving, by a second terminal device, a first request sent by a first terminal device, where the first request is used to request location information of the second terminal device; and sending, by the second terminal device, a first message to the first terminal device, where the first message contains the location information of the second terminal device. In this way, after the second terminal device accepts the request from the first terminal device, and sends the location information to the first terminal device, a user can sense an azimuth status of a peer end during a voice call based on voice signals fed back by a first headphone connected to the first terminal device, thereby enriching content of the voice call.

In a possible implementation, the sending, by the second terminal device, a first message to the first terminal device includes: displaying, by the second terminal device, a second interface in response to the first request, where the second interface is an interface used for prompting a voice call, and includes a fourth control; and sending, by the second terminal device, the first message to the first terminal device when the second terminal device receives, within a first time threshold, a second operation of triggering the fourth control. In this way, when the user selects a positioning-assisted call mode before making the call, and the peer end accepts the call mode, the user can sense the azimuth status of the peer end based on the voice having the sense of azimuth.

In a possible implementation, the first message further includes orientation information of the second terminal device, and the sending, by the second terminal device, a first message to the first terminal device includes: displaying, by the second terminal device, a third interface in response to the second operation, where the third interface is used to determine an initial azimuth of the second terminal device, and displays a compass used for indicating an azimuth; receiving, by the second terminal device in the third interface, a third operation used for azimuth calibration; and sending, by the second terminal device, the first message to the first terminal device in response to the third operation. In this way, the second terminal device can determine an azimuth and an orientation of the second terminal device based on azimuth calibration. Then, the second terminal device can also determine an azimuth status of the first terminal device relative to the second terminal device based on the orientation information and the location information of the second terminal device and the location information of the first terminal device.

In a possible implementation, the method further includes: displaying, by the second terminal device, first prompt information, where the first prompt information is used to prompt an applicable range of the first function.

In a possible implementation, the sending, by the second terminal device, a first message to the first terminal device includes: displaying, by the second terminal device, second prompt information in response to the first request, where the second prompt information includes an eleventh control and a twelfth control; and sending, by the second terminal device, the first message to the first terminal device when the second terminal device receives, within a second time threshold, a fifth operation of triggering the eleventh control. In this way, during the voice call, after the second terminal device accepts the request that is for a positioning assist and that is from the first terminal device, the first terminal device can determine an azimuth status between the two devices based on the location information of the second terminal device. Then, the user can sense the azimuth status of the peer end by using the first headphone connected to the first terminal device.

According to a fourth aspect, an embodiment of this application provides a voice call apparatus. The voice call apparatus is applied to a voice call system, where the voice call system includes a first terminal device, a second terminal device, and a first headphone connected to the first terminal device. The voice call apparatus includes: a communications unit, configured to: send a first request to the second terminal device, where the first request is used to request location information of the second terminal device; and send a first message to the first terminal device, where the first message contains the location information of the second terminal device; and a processing unit, configured to: obtain azimuth information between the first terminal device and the second terminal device based on location information and orientation information of the first terminal device and the location information of the second terminal device; and when the azimuth information indicates that the second terminal device is located at a first side of the first terminal device, process a voice signal from the second terminal device based on the azimuth information to obtain a first-channel voice signal and a second-channel voice signal. The communications unit is further configured to send the first-channel voice signal and the second-channel voice signal to a first channel and a second channel of the first headphone, respectively, where the first headphone includes a first earpiece and a second earpiece, the first earpiece corresponds to the first channel, and the second earpiece corresponds to the second channel. The processing unit is further configured to play the first-channel voice signal and the second-channel voice signal in the first channel and the second channel, respectively.

In a possible implementation, the first side corresponds to the first channel of the first headphone, and a signal strength of the first-channel voice signal is greater than that of the second-channel voice signal.

In a possible implementation, a time delay of the first-channel voice signal is less than that of the second-channel voice signal.

In a possible implementation, a display unit is specifically configured to display a first interface, where the first interface is an interface used for calling the second terminal device, and includes a first control; the processing unit is specifically configured to receive a first operation of selecting the first control; and the processing unit is further specifically configured to enable a first function in response to the first operation, where the first function is used to assist in positioning during a voice call.

In a possible implementation, the first interface further displays a first pop-up window; and the first pop-up window displays, in a form of a list, the first control, a second control used for making a call, and a third control used for editing a number before calling the number.

In a possible implementation, the display unit is specifically configured to display a second interface in response to the first request, where the second interface is an interface used for prompting a voice call, and includes a fourth control; and the communications unit is specifically configured to send the first message to the first terminal device when the second terminal device receives, within a first time threshold, a second operation of triggering the fourth control.

In a possible implementation, the display unit is specifically configured to display a third interface in response to the second operation, where the third interface is used to determine an initial azimuth of the second terminal device, and displays a compass used for indicating an azimuth; the processing unit is specifically configured to receive, in the third interface, a third operation used for azimuth calibration; and the communications unit is specifically configured to send the first message to the first terminal device in response to the third operation.

In a possible implementation, the display unit is further configured to display first prompt information, where the first prompt information is used to prompt an applicable range of the first function.

In a possible implementation, the display unit is specifically configured to display a fourth interface, where the fourth interface is an interface of a voice call, and includes a fifth control; the processing unit is specifically configured to receive a fourth operation of selecting the fifth control; and the processing unit is further specifically configured to enable the first function in response to the fourth operation, where the first function is used to assist in positioning during a voice call.

In a possible implementation, the fourth interface further displays a sixth control used for recording, a seventh control used for voice on hold, the fifth control, an eighth control used for making a video call, a ninth control used for muting, and a tenth control used for viewing a contact.

In a possible implementation, the display unit is further configured to display second prompt information in response to the first request, where the second prompt information includes an eleventh control and a twelfth control; and the communications unit is specifically configured to send the first message to the first terminal device when the second terminal device receives, within a second time threshold, a fifth operation of triggering the eleventh control.

In a possible implementation, a voice call interface of the first terminal device further includes a thirteenth control; the processing unit is further configured to receive a sixth operation of triggering the thirteenth control; and the display unit is further configured to display a map interface in the voice call interface in response to the sixth operation, where the map interface includes locations of the first terminal device and the second terminal device, and a route from the first terminal device to the second terminal device.

In a possible implementation, the processing unit is specifically configured to query a preset spatial cue library for a spatial cue corresponding to the azimuth information, where the spatial cue library includes a plurality of correspondences; any of the correspondences includes azimuth information and a spatial cue corresponding to the azimuth information; the spatial cue includes a binaural cue and a monoaural cue; the binaural cue is used to reflect a change of voice in a horizontal direction, and includes an interaural level difference (ILD) and an interaural time difference (ITD); and the monoaural cue is used to reflect a change of the voice in a vertical direction. The processing unit is further specifically configured to: map the voice signal onto a first source signal corresponding to the first channel and a second source signal corresponding to the second channel; superpose the ITD onto the second source signal to obtain a superposed second source signal; superpose the ILD onto the first source signal to obtain a superposed first source signal; and generate a filter coefficient by using the monoaural cue, and separately perform filtering on the superposed first source signal and the superposed second source signal based on the filter coefficient, to obtain the first-channel voice signal and the second-channel voice signal.

According to a fifth aspect, an embodiment of this application provides a voice call apparatus. A first terminal device is connected to a first headphone. The voice call apparatus includes: a communications unit, configured to: send a first request to a second terminal device, where the first request is used to request location information of the second terminal device; and receive a first message sent by the second terminal device, where the first message contains the location information of the second terminal device; and a processing unit, configured to: obtain azimuth information between the first terminal device and the second terminal device based on location information and orientation information of the first terminal device and the location information of the second terminal device; obtain the azimuth information between the first terminal device and the second terminal device based on the location information and the orientation information of the first terminal device and the location information of the second terminal device; and process a voice signal from the second terminal device based on the azimuth information to obtain a first-channel voice signal and a second-channel voice signal. The communications unit is further configured to send the first-channel voice signal and the second-channel voice signal to a first channel and a second channel of the first headphone, respectively, where the first headphone includes a first earpiece and a second earpiece, the first earpiece corresponds to the first channel, and the second earpiece corresponds to the second channel. The processing unit is further configured to play the first-channel voice signal and the second-channel voice signal in the first channel and the second channel, respectively.

In a possible implementation, the first side corresponds to the first channel of the first headphone, and a signal strength of the first-channel voice signal is greater than that of the second-channel voice signal.

In a possible implementation, a time delay of the first-channel voice signal is less than that of the second-channel voice signal.

In a possible implementation, a display unit is specifically configured to display a first interface, where the first interface is an interface used for calling the second terminal device, and includes a first control; the processing unit is specifically configured to receive a first operation of selecting the first control; and the processing unit is further specifically configured to enable a first function in response to the first operation, where the first function is used to assist in positioning during a voice call.

In a possible implementation, the first interface further displays a first pop-up window; and the first pop-up window displays, in a form of a list, the first control, a second control used for making a call, and a third control used for editing a number before calling the number.

In a possible implementation, the display unit is specifically configured to display a fourth interface, where the fourth interface is an interface of a voice call, and includes a fifth control; the processing unit is specifically configured to receive a fourth operation of selecting the fifth control; and the processing unit is further specifically configured to enable the first function in response to the fourth operation, where the first function is used to assist in positioning during a voice call.

In a possible implementation, the fourth interface further displays a sixth control used for recording, a seventh control used for voice on hold, the fifth control, an eighth control used for making a video call, a ninth control used for muting, and a tenth control used for viewing a contact.

In a possible implementation, a voice call interface of the first terminal device further includes a thirteenth control; the processing unit is specifically configured to receive a sixth operation of triggering the thirteenth control; and the display unit is specifically configured to display a map interface in the voice call interface in response to the sixth operation, where the map interface includes locations of the first terminal device and the second terminal device, and a route from the first terminal device to the second terminal device.

In a possible implementation, the processing unit is specifically configured to query a preset spatial cue library for a spatial cue corresponding to the azimuth information, where the spatial cue library includes a plurality of correspondences; any of the correspondences includes azimuth information and a spatial cue corresponding to the azimuth information; the spatial cue includes a binaural cue and a monoaural cue; the binaural cue is used to reflect a change of voice in a horizontal direction, and includes an interaural level difference (ILD) and an interaural time difference (ITD); and the monoaural cue is used to reflect a change of the voice in a vertical direction. The processing unit is further specifically configured to: map the voice signal onto a first source signal corresponding to the first channel and a second source signal corresponding to the second channel; superpose the ITD onto the second source signal to obtain a superposed second source signal; superpose the ILD onto the first source signal to obtain a superposed first source signal; and generate a filter coefficient by using the monoaural cue, and separately perform filtering on the superposed first source signal and the superposed second source signal based on the filter coefficient, to obtain the first-channel voice signal and the second-channel voice signal.

According to a sixth aspect, an embodiment of this application provides a voice call apparatus. The voice call apparatus includes a communications unit, configured to: receive a first request sent by a first terminal device, where the first request is used to request location information of the second terminal device; and send a first message to the first terminal device, where the first message contains the location information of the second terminal device.

In a possible implementation, a display unit is specifically configured to display a second interface in response to the first request, where the second interface is an interface used for prompting a voice call, and includes a fourth control; and the communications unit is specifically configured to send the first message to the first terminal device when the second terminal device receives, within a first time threshold, a second operation of triggering the fourth control.

In a possible implementation, the first message further includes orientation information of the second terminal device. The display unit is specifically configured to display a third interface in response to the second operation, where the third interface is used to determine an initial azimuth of the second terminal device, and displays a compass used for indicating an azimuth; the processing unit is specifically configured to receive, in the third interface, a third operation used for azimuth calibration; and the communications unit is specifically configured to send the first message to the first terminal device in response to the third operation.

In a possible implementation, the display unit is further configured to display first prompt information, where the first prompt information is used to prompt an applicable range of the first function.

In a possible implementation, the display unit is specifically configured to display second prompt information in response to the first request, where the second prompt information includes an eleventh control and a twelfth control; and the communications unit is specifically configured to send the first message to the first terminal device when the second terminal device receives, within a second time threshold, a fifth operation of triggering the eleventh control.

According to a seventh aspect, an embodiment of this application provides a voice call apparatus. The voice call apparatus includes a processor and a memory. The memory is configured to store a code instruction. The processor is configured to run the code instruction, so that an electronic device is enabled to execute the voice call method described in the first aspect or any one of the implementations of the first aspect, the voice call method described in the second aspect or any one of the implementations of the second aspect, or the voice call method described in the third aspect or any one of the implementations of the third aspect.

According to an eighth aspect, an embodiment of this application provides a computer-readable storage medium. The computer-readable storage medium stores an instruction. When the instruction is executed, a computer is enabled to execute the voice call method described in the first aspect or any one of the implementations of the first aspect, the voice call method described in the second aspect or any one of the implementations of the second aspect, or the voice call method described in the third aspect or any one of the implementations of the third aspect.

According to a ninth aspect, a computer program product is provided. The computer program product includes a computer program. When the computer program is run, a computer is enabled to execute the voice call method described in the first aspect or any one of the implementations of the first aspect, the voice call method described in the second aspect or any one of the implementations of the second aspect, or the voice call method described in the third aspect or any one of the implementations of the third aspect.

It should be understood that technical solutions of the fourth aspect to the ninth aspect of this application correspond to those of the first aspect to the third aspect of this application. Beneficial effects achieved by these aspects and corresponding implementations are similar. Details are not described again.

DESCRIPTION OF EMBODIMENTS

For ease of clearly describing the technical solutions in the embodiments of this application, in the embodiments of this application, words "first", "second", and the like are used to distinguish between same or similar items with basically the same functions or effects. For example, a first terminal device and a second terminal device are merely for distinguishing different terminal devices, rather than limiting a sequential order. Those skilled in the art may understand that the words "first", "second", and the like are not intended to limit a quantity and an execution order, and are also unnecessarily different.

It should be noted that in this application, the term "exemplary", "for example", or the like is used to indicate an example, an illustration, or a description. Any embodiment or design scheme described as "exemplary" or "for example" in this application should not be construed as being preferable or advantageous than other embodiments or design schemes. To be precise, the term "exemplary.", "for example", or the like is intended to present a related concept in a specific manner.

In this application, the term "at least one" refers to one or more, and the term "a plurality of" refers to two or more. The term "and/or" is an association relationship for describing associated objects, and represents that three relationships may exist, for example, A and/or B may represent that: A exists alone, A and B exist at the same time, and B exists alone. The character "/" generally indicates that the associated objects are in an "or" relationship. The term "at least one of the following items/( )" or a similar expression refers to any combination of these items, including any combination of single items/( ) or plural items/( ). For example, at least one of a, b, or c may represent: a, b, c, a and b, a and c, b and c, or a, b, and c, where a, b, and c may be singular or plural.

In actual life of human beings, there are various out-of-sight scenarios. Therefore, people have long developed a method for determining an azimuth of the other party via hearing. For example, when a mother and a son are in a house at the same time, the mother is in a kitchen and calls the son, and the son is in a bedroom and responds to the mother, the mother can determine a location of the son in the house based on voice of the son even when the mother cannot see the son. For another example, user A walking in a street can determine an approximate azimuth of user B based on user B's voice even when user A cannot see user B. This may be understood as follows: An auditory sensation is one of important means by which people identify a direction.

Figure 1:
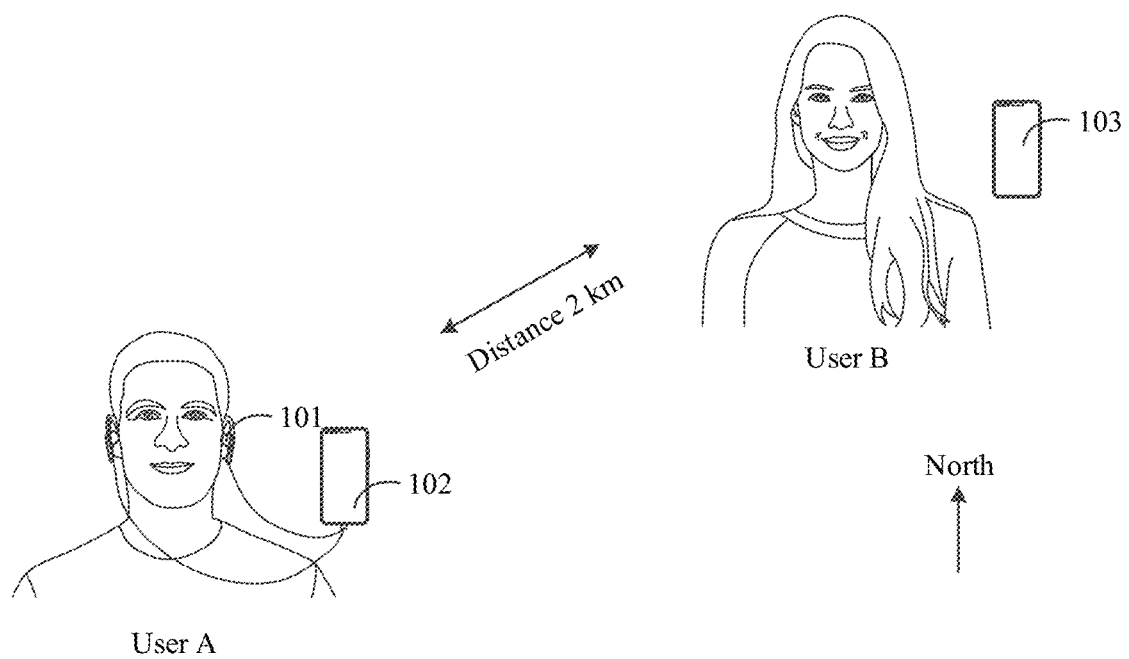
FIG. 1 is a schematic diagram of a scenario according to an embodiment of this application.

Generally, when a distance between user A and user B is too long to transfer azimuth information based on voice, user A may make a voice call to user B by using a terminal device, thereby determining an approximate azimuth of user B. For example. FIG. 1 is a schematic diagram of a scenario according to an embodiment of this application.

As shown in FIG. 1, the distance between user A and user B may be 2 kilometers (km). User A wears a headphone 101, and makes a voice call to user B by using a smart phone 102. User B answers, by using a smart phone 103, the voice call made by user A. After user A makes the voice call to user B, user B may describe, to user A, a current location of user B, for example, user B being located at a south gate of a park.

Then, user A may walk towards the south gate of the park and find user B at the south gate of the park.

However, in some complex environments where earth's surface features are difficult to describe, for example, user A and user B are in different regions or on different floors in a shopping mall, or user A and user B are in a field environment or another scenario. In this complex scenario, even when user A makes a voice call to user B, user B cannot accurately describe a current earth's surface feature because user B does not know a current environment. In this case, user A cannot determine user B's azimuth based on the voice call. Alternatively, user B accurately describes the current earth's surface feature, but user A does not know the current environment. As a result, it is hard for user A to determine an azimuth of user B based on the voice call.

In view of this, an embodiment of this application provides a voice call method. A terminal device may add a spatial cue into a voice call, thereby enhancing user's sense of azimuth during the voice call. For example, when user A makes a voice call to user B, user A may sense an azimuth of user B based on user B's voice fed back in a headphone; or user B may sense an azimuth of user A based on user A's voice fed back in a headphone.

It may be understood that the above terminal device may also be referred to as a terminal (terminal), user equipment (user equipment, UE), a mobile station (mobile station, MS), a mobile terminal (mobile terminal, MT), and the like. The terminal device may be a mobile phone (mobile phone), a smart television, a wearable device, a tablet computer (pad), a computer having a wireless transmission and reception function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. A specific technology and a specific device form that are used by the terminal device are not limited in the embodiments of this application.

Figure 2:
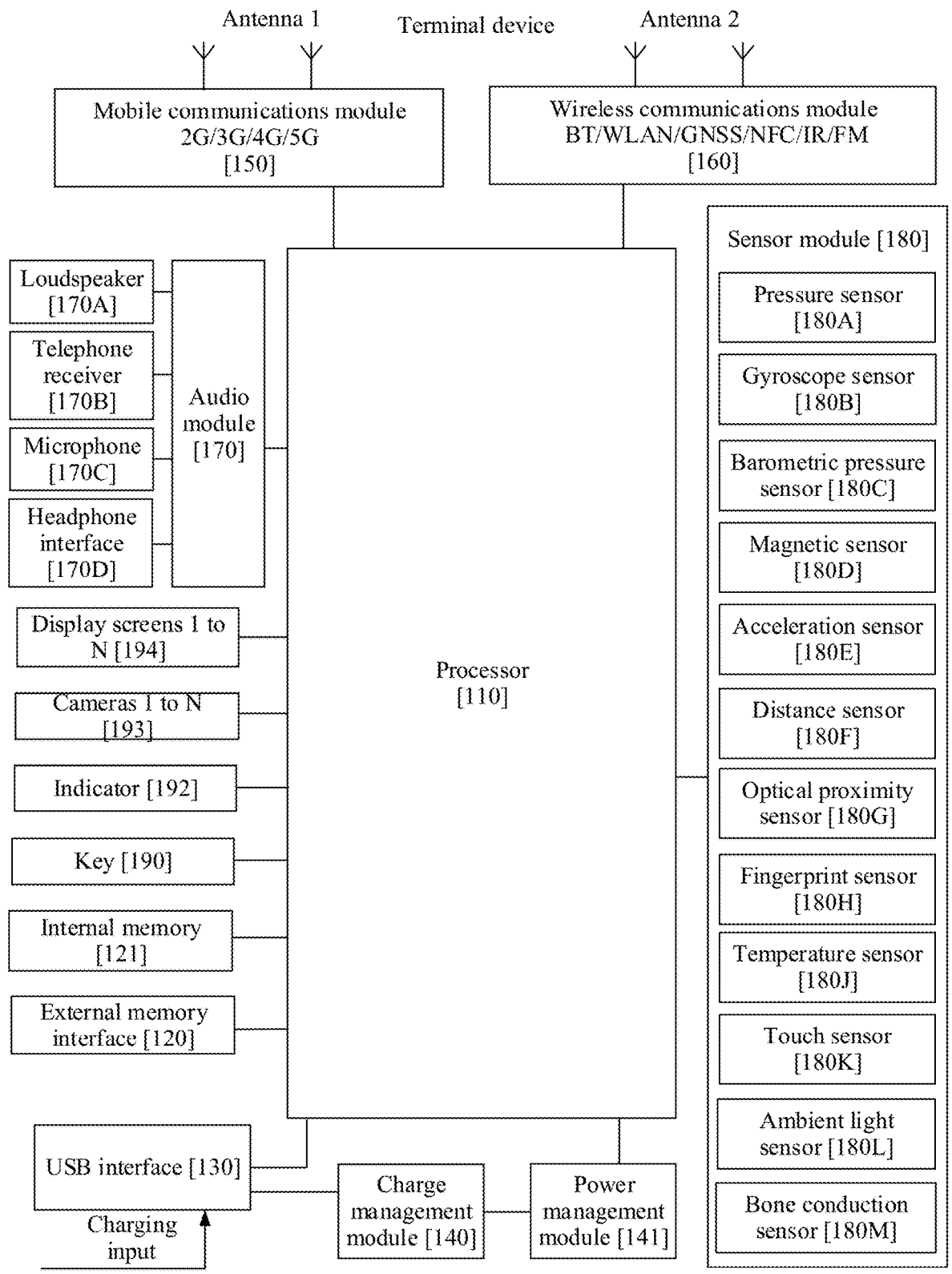
FIG. 2 is a schematic structural diagram of a terminal device according to an embodiment of this application.

For better understanding of this embodiment of this application, the following describes a structure of the terminal device in this embodiment of this application. For example. FIG. 2 is a schematic structural diagram of a terminal device according to an embodiment of this application.

The terminal device may include a processor 110, an external memory interface 120, an internal memory 121, a universal serial bus (universal serial bus. USB) interface 130, a charge management module 140, a power management module 141, an antenna 1, an antenna 2, a mobile communications module 150, a wireless communications module 160, an audio module 170, a speaker 170A, a telephone receiver 170B, a microphone 170C, a headphone interface 170D, a sensor module 180, a key 190, an indicator 192, a camera 193, a display screen 194, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation to the terminal device. In some other embodiments of this application, the terminal device may include more or fewer components than those shown in the figure, or some components may be combined or split, or there may be a different component arrangement. The components shown in the figure may be implemented with hardware, software, or a combination thereof.

The processor 110 may include one or more processing units. Different processing units may be independent components or may be integrated in one or more processors. The processor 110 may be further provided with a memory, configured to store an instruction and data.

The USB interface 130 is an interface conforming to the USB standard specification, and may specifically be a mini USB interface, a micro USB interface, a USB Type-C interface, or the like. The USB interface 130 may be configured to be connected to a charger for charging the terminal device, configured to transmit data between the terminal device and a peripheral device, or configured to be connected to a headphone to play audio through the headphone. The interface may also be configured to be connected to another electronic device, for example, an AR device.

The charge management module 140 is configured to receive a charging input from the charger. The charger may be a wireless charger or a wired charger. The power management module 141 is configured to be connected to the charge management module 140 and the processor 110.

A wireless communication function of the terminal device may be implemented by using the antenna 1, the antenna 2, the mobile communications module 150, the wireless communications module 160, a modem processor, a baseband processor, and the like.

The antenna 1 and the antenna 2 are configured to transmit and receive electromagnetic wave signals. The antennas in the terminal device may be configured to cover one or more communications bands. Alternatively, different antennas may be multiplexed to improve antenna utilization.

The mobile communications module 150 may provide a solution to a wireless communication that is based on 2G/3G/4G/5G or the like and that is applied to the terminal device. The mobile communications module 150 may include at least one filter, a switch, a power amplifier, a low noise amplifier (low noise amplifier, LNA), and the like. The mobile communications module 150 may receive an electromagnetic wave through the antenna 1, preform processing such as filtering and amplification on the received electromagnetic wave, and transmit a processed electromagnetic wave to the modem processor for demodulation.

The wireless communications module 160 may provide a solution that is applied to the terminal device and that is for a wireless communication based on a wireless local area network (wireless local area network, WLAN) (for example, a wireless fidelity (wireless fidelity, Wi-Fi) network), bluetooth (bluetooth, BT), a global navigation satellite system (global navigation satellite system, GNSS), frequency modulation (frequency modulation, FM), or the like.

The terminal device implements a display function by using a GPU, the display screen 194, an application processor, and the like. The GPU is a microprocessor used for image processing, is connected to the display screen 194 and the application processor, and is configured to perform mathematical and geometric calculations for graphic rendering.

The display screen 194 is configured to display an image, a video, or the like, and includes a display panel. In some embodiments, the terminal device may include one or N display screens 194, where N is a positive integer greater than 1.

The terminal device may implement a shooting function by using an ISP, the camera 193, a video codec, the GPU, the display screen 194, the application processor, and the like.

The camera 193 is configured to capture a static image or a video. In some embodiments the terminal device may include one or M cameras 193, where M is a positive integer greater than 1.

The external memory interface 120 may be configured to be connected to an external storage card, for example, a micro SD card, thereby extending a storage capability of the terminal device. The external storage card communicates with the processor 110 through the external memory interface 120, to implement a data storage function. For example, files such as music and a video are stored into the external storage card.

The internal memory 121 may be configured to store computer executable program code that includes an instruction. The internal memory 121 may include a program storage area and a data storage area.

The terminal device may implement an audio function through the audio module 170, the speaker 170A, the telephone receiver 170B, the microphone 170C, the application processor, and the like, for example, playing music, recording, or the like.

The audio module 170 is configured to convert digital audio information into an analog audio signal, and convert an analog audio input into a digital audio signal. The speaker 170A, also referred to as "horn", is configured to convert an electrical audio signal into a voice signal. The terminal device may listen to music or answer a hands-free call through the speaker 170A. The telephone receiver 170B, also referred to as "earpiece", is configured to convert an electrical audio signal into a voice signal. A user using the terminal device may answer a call or listen to audio information by moving the telephone receiver 170B close to his/her ear. The microphone 170C, also referred to as "mouthpiece", is configured to convert a voice signal into an electrical signal. The headphone interface 170D is configured to be connected to a wired headphone. In this embodiment of this application, the terminal device may receive audio data by using the audio module 170 for processing. For example, in a call scenario, the terminal device may receive audio data, and process the audio data by using a processor in the audio module, for example, map monophonic audio data onto two channels, and perform processing such as spatial cue superposition on signals output through the two channels. Subsequently, a peer end of a call may receive processed signals, and listen to voice having a sense of azimuth through the headphone interface 170D.

The pressure sensor 180A is configured to sense a pressure signal, and may convert the pressure signal into an electrical signal. In some embodiments, the pressure sensor 180A may be disposed in the display screen 194.

The gyroscope sensor 180B may be configured to determine a movement gesture of the terminal device.

The barometric pressure sensor 180C is configured to measure a barometric pressure. The magnetic sensor 180D includes a Hall sensor.

The acceleration sensor 180E may detect accelerations in all directions (generally, three axes) of the terminal device. In this embodiment of this application, the terminal device may implement a compass function based on the gyroscope sensor 180B, the acceleration sensor 180E, and the like, for example, may perform front orientation calibration on the terminal device by using a sensor in a compass.

The distance sensor 180F is configured to measure a distance. In this embodiment of this application, the terminal device may identify a movement status of the terminal device based on the gyroscope sensor 180B, the acceleration sensor 180E, the distance sensor 180F, and the like, for example, may identify movement of the terminal device from location A to location B or identify an azimuth angle by which the terminal device is moved.

For example, the optical proximity sensor 180G may include a light-emitting diode (LED) and an optical detector, for example, a photodiode.

The ambient light sensor 180L is configured to sense an intensity of ambient light.

The fingerprint sensor 180H is configured to collect a fingerprint.

The temperature sensor 180J is configured to detect a temperature.

The touch sensor 180K, also referred to as "touch component", may be disposed in the display screen 194. The touch sensor 180K and the display screen 194 constitute a touch screen that is also referred to as "touch panel".

The bone conduction sensor 180M may be configured to obtain a vibration signal.

The key 190 includes a start key, a volume key, and the like, and may be a mechanical key or a touch key. The terminal device may receive a key input and generate a key signal input related to user settings and function control of the terminal device. The indicator 192 may be an indicator lamp, and may be configured to indicate a charging status and a power change, or indicate that there is an unread message, a missed call, an unread notification, and the like.

A software system of the terminal device may use a layered architecture, an event-driven architecture, a microcore architecture, a micro-service architecture, a cloud architecture, or the like. Details are not described herein again.

The following describes terms used in the embodiments of this application. It may be understood that the following is intended to describe the embodiments of this application more clearly, and do not necessarily constitute a limitation on this application.

The binaural cue described in the embodiments of this application may include an interaural level difference (interaural level difference. ILD), an interaural time difference (interaural time difference. ITD), and the like. The binaural cue may be configured to represent an azimuth change of voice on a horizontal plane. The ILD may be understood as a difference between levels of voice received by a left ear and a right ear. The ITD may be understood as a difference between moments at which the left ear and the right ear receive the voice.

The monoaural cue described in the embodiments of this application may be configured to represent Based on spectral changes caused by reflecting signals from different directions by a body, a trunk, an auricle, an external ear, or the like, a brain can decode a change in a vertical direction of an auditory sensation based on a change of a spectrum of a single ear. In this embodiment of this application, the monoaural cue may be further configured to generate a filter coefficient of a finite impulse response (finite impulse response, FIR) filter in a spatial cue superposition process.

It may be understood that the binaural cue and the monoaural cue do not work in a completely independent manner, but partially coordinate with each other. Therefore, coordination between the binaural cue and the monoaural cue may be described by using an interaural cross correlation coefficient (inter aural cross correlation coefficient, IACC).

The technical solution of this application and how the technical solution of the present disclosure resolves the above technical problem are described in detail below with reference to specific embodiments. The following specific embodiments may be implemented independently or combined with each other, and the same or similar concepts or processes may not be repeatedly described in some embodiments.

For example, when user A (or may be understood as a tourist) ends visiting a park for pleasure, and calls a special car by using device A for driving him/or her home, because the park has a plurality of exits, and user A is unfamiliar with an azimuth of an exit of the park, it is difficult for user A to accurately describe, to user B, an exit where user A and user B (or may be understood as a special car driver) are to meet each other. In this case, user A may make, to user B, a voice call having a positioning assist function. When user B answers the voice call having the positioning assist function, user A and user B may obtain each other's location based on the voice call including the spatial cue.

Figure 3:
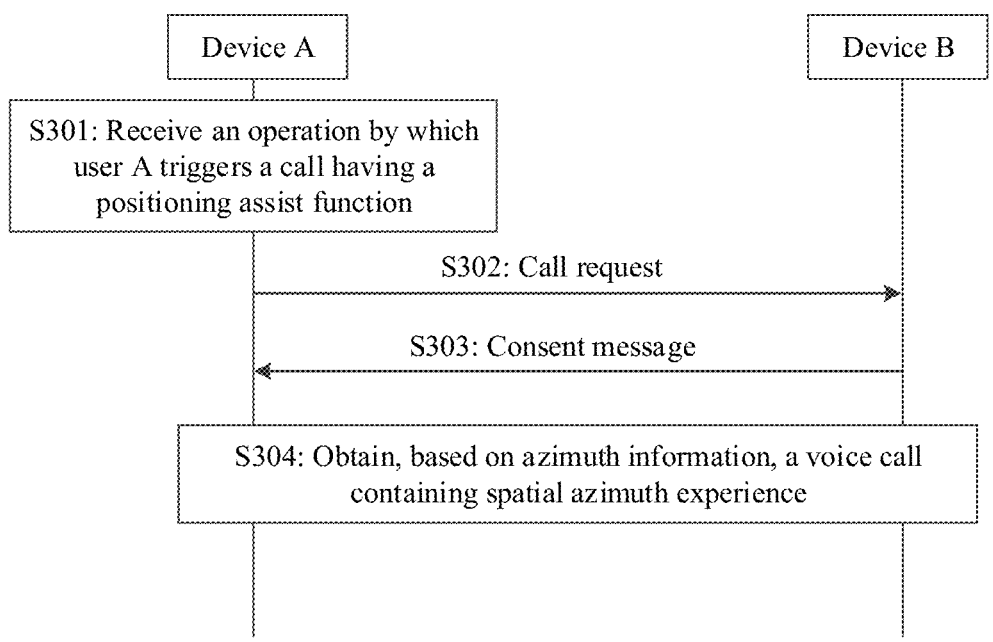
FIG. 3 is a schematic flowchart of a real-time voice call method containing spatial azimuth experience according to an embodiment of this application.

For example, FIG. 3 is a schematic flowchart of a real-time voice call method containing spatial azimuth experience according to an embodiment of this application. As shown in FIG. 3, the method may include the following steps.

S301: Device A receives an operation by which user A triggers a call having a positioning assist function.

In this embodiment of this application, the positioning assist function may be configured to superpose a spatial cue to a voice call, so that the terminal device may obtain voice having a sense of azimuth.

For example, there are two manners in which user A triggers the call having the positioning assist function. Manner 1: Before making the call, user A selects a call mode having a positioning assist function (refer to an embodiment corresponding to FIG. 4). Manner 2: User A enables the positioning assist function when making a call to user B (refer to an embodiment corresponding to FIG. 5). The embodiments corresponding to FIG. 4 and FIG. 5 are described by using an example in which the terminal device is a mobile phone, a mobile phone of user A is referred to as device A, and a mobile phone of user B is referred to as device B. This example does not constitute a limitation on this embodiment of this application.

Manner 1: Before making the call, user A triggers a call mode having a positioning assist function.

Figure 4A:
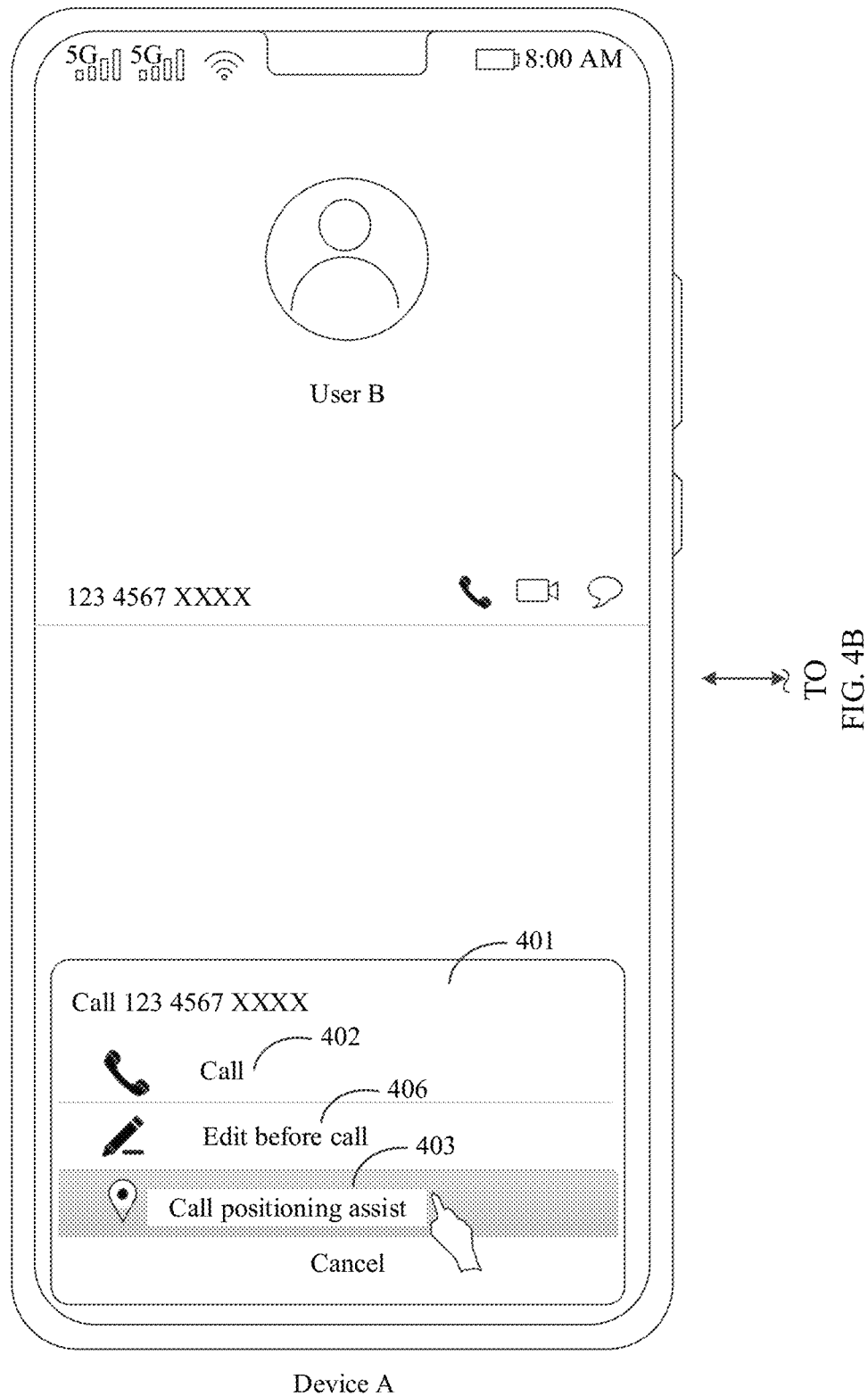
FIG. 4 is a schematic diagram of an interface for enabling a positioning assist according to an embodiment of this application.

For example, FIG. 4 is a schematic diagram of an interface for enabling a positioning assist according to an embodiment of this application. Referring to the interface shown in FIG. 4A, when device A receives user A's operation of triggering a control corresponding to user B's phone number 1234567XXXX, device A may display a call option 401. The call option 401 may include one or more of the following items: "Call" 402, "Edit before call" 406, "Call positioning assist" 403, or another option. When device A receives user A's operation of triggering a control corresponding to "Call positioning assist" 403, device A may perform step S302, that is, device A sends, to device B, a call request having a positioning assist function. Alternatively, when device A receives user A's operation of triggering a control corresponding to "Call" 402, device A may send a call request to device B.

Figure 4B:
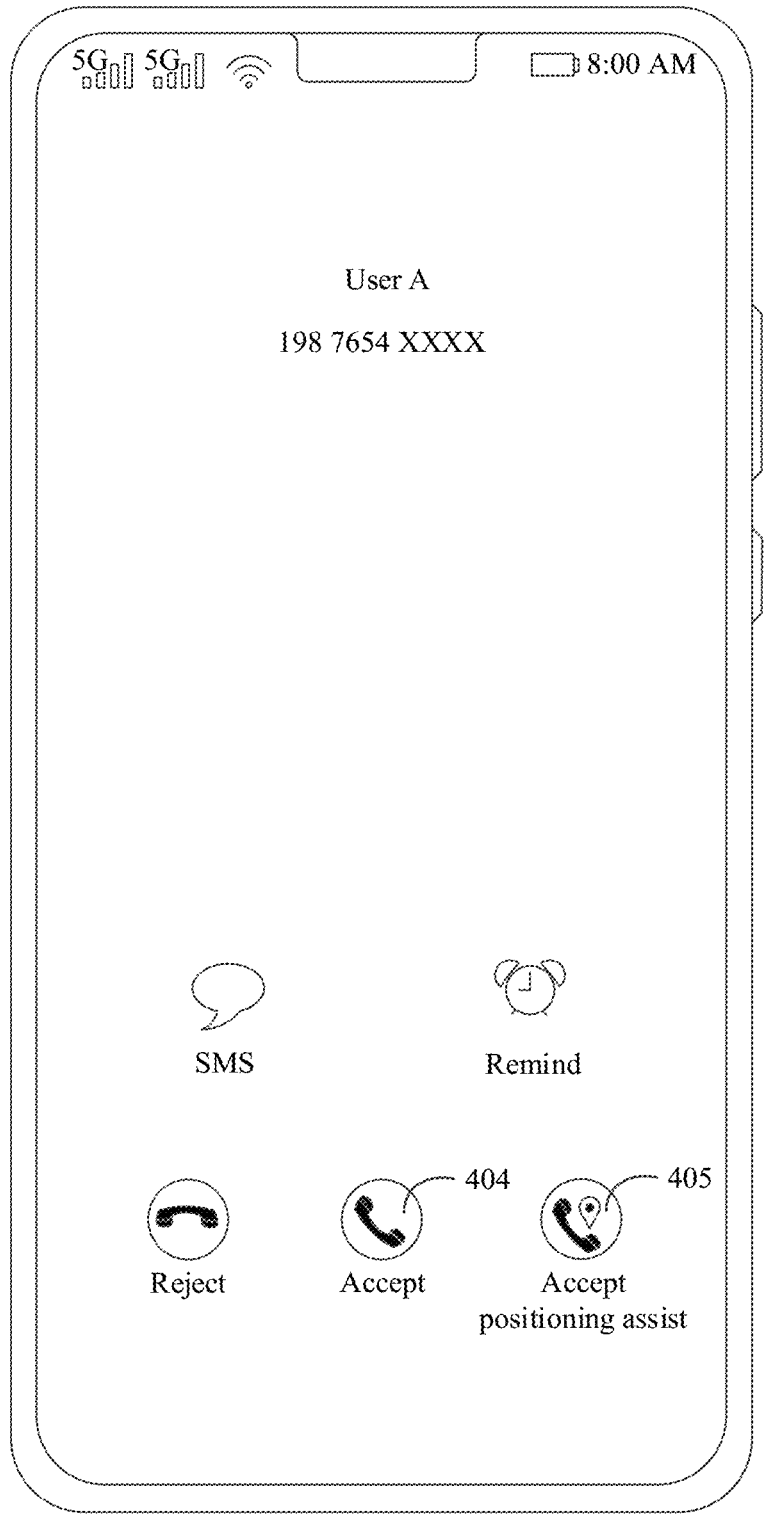

Accordingly, device B may receive the call request having the positioning assist function sent by device A, and display the interface shown in FIG. 4B. The interface may include one or more of the following items: "SMS", "Remind", "Reject", "Accept" 404, or "Accept positioning assist" 405. When device B receives user B's operation of triggering a control corresponding to "Accept positioning assist" 405, device B may perform step S303, that is, device B sends, to device A, a message for accepting a positioning assist. Alternatively, when device B receives user B's operation of triggering a control corresponding to "Accept" 404, device B may send, to device A, a message for accepting the call request.

Manner 2: User A enables the positioning assist function when making a call to user B.

Figure 5A:
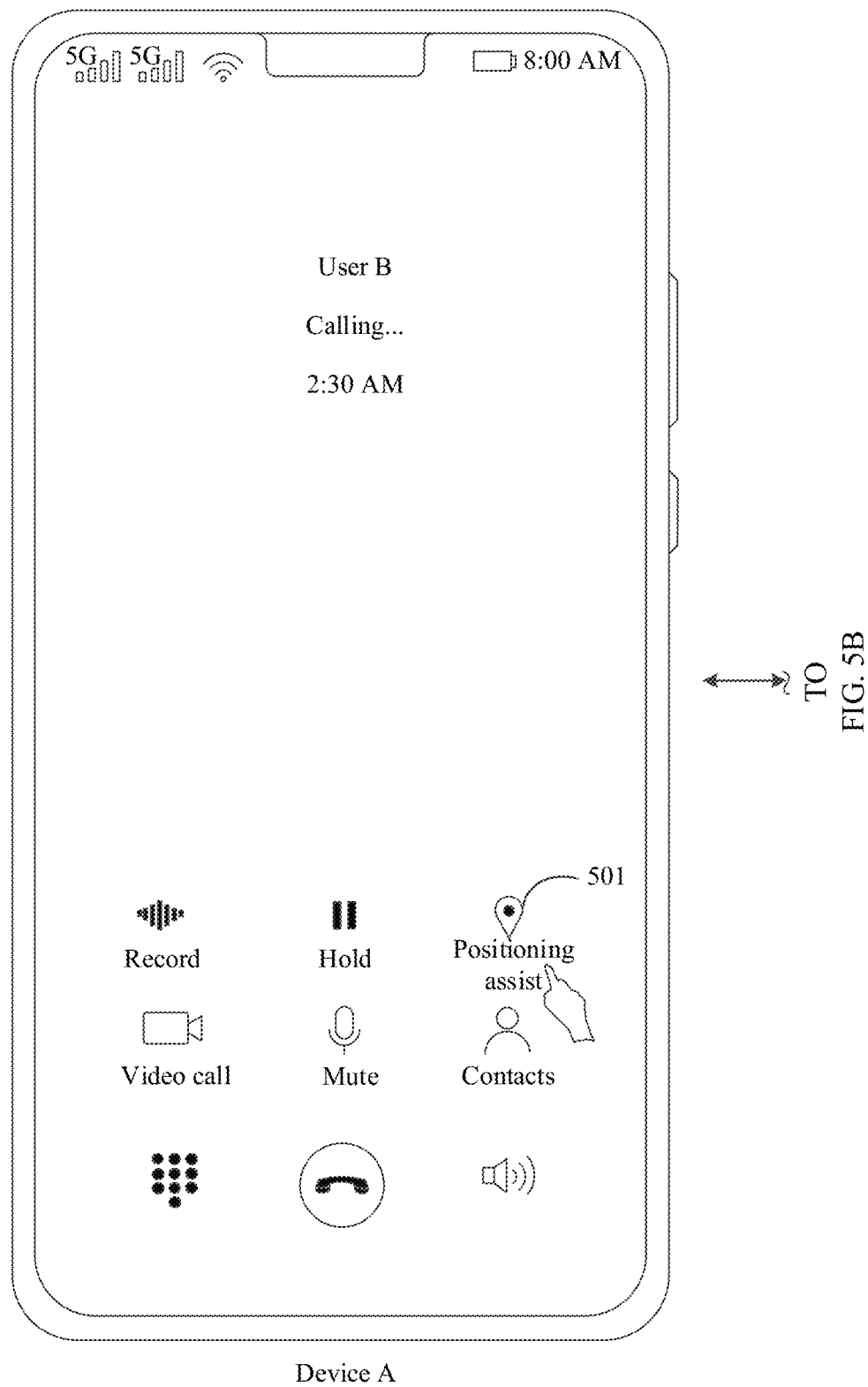
FIG. 5 is a schematic diagram of another interface for enabling a positioning assist according to an embodiment of this application.

FIG. 5 is a schematic diagram of another interface for enabling a positioning assist according to an embodiment of this application. When user A calls user B by using device A, device A may display the interface shown in FIG. 5A. The interface may include one or more of the following function controls: "Record", "Hold", "Positioning assist" 501, "Video call", "Mute", "Contacts", and the like. When device A receives user A's operation of triggering a control corresponding to "Positioning assist" 501, device A may perform step S302, that is, device A sends, to device B, a call request having a positioning assist function.

Figure 5B:
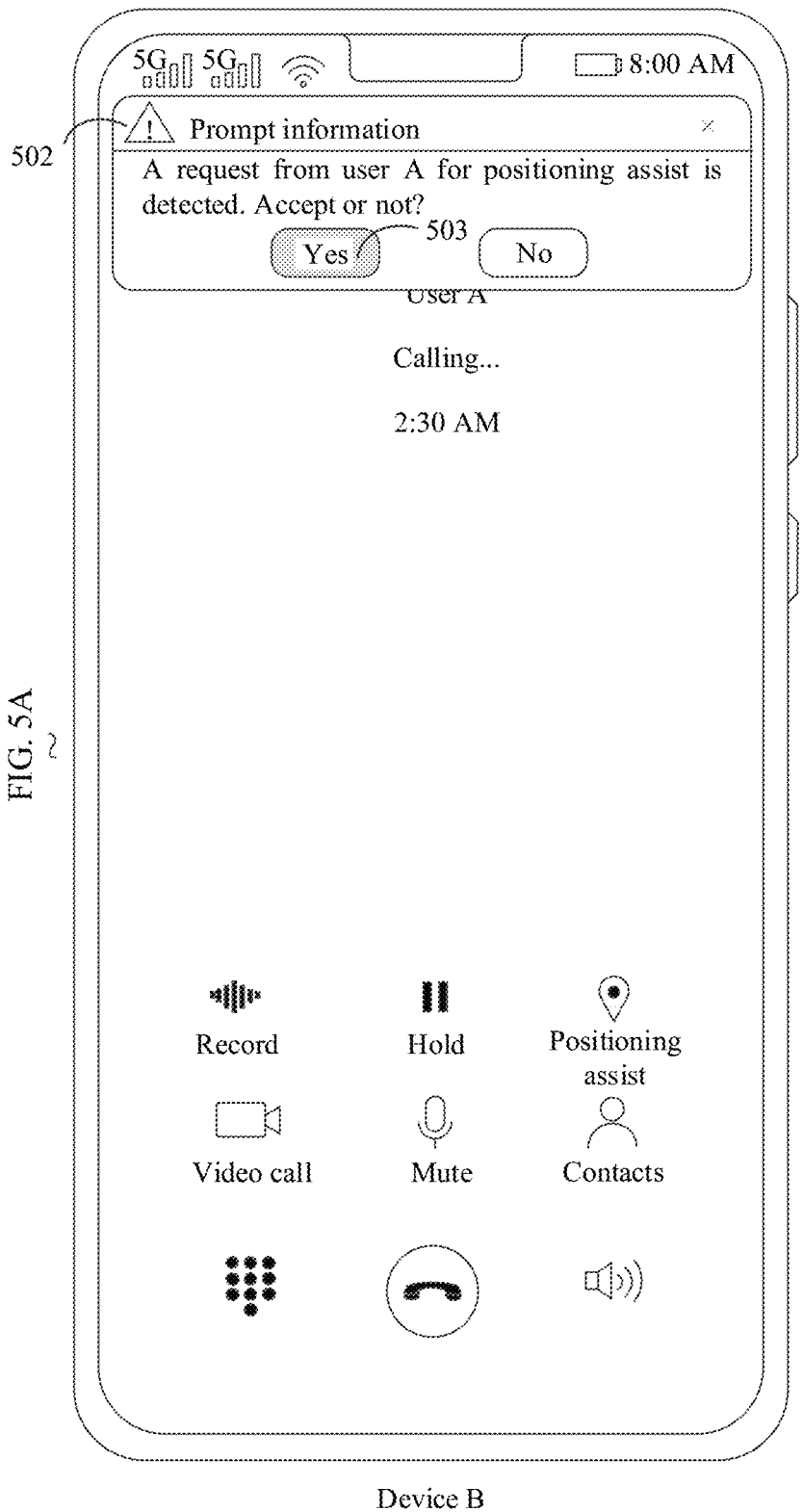

Accordingly, device B may receive the call request having the positioning assist function sent by device A, and display the interface shown in FIG. 5B. The interface may include prompt information 503. The prompt information may display the following content: "A request from user A for a positioning assist is detected. Accept or not?" When device B receives user B's operation of triggering a control corresponding to "Yes" 503, device B may perform step S303, that is, device B sends, to device A, a message for accepting a positioning assist.

S302: Device A sends a call request to device B.

Accordingly, device B may receive the call request sent by device A.

S303: Device B sends an accept message to device A.

Accordingly, device A may receive the accept message sent by device B. For example, when device A receives the consent message sent by device B, device A may perform positioning on device B based on a voice call; or device B may perform positioning on device A based on the voice call. In this case, the interfaces of device A and device B may prompt an applicable condition of the positioning assist function, for example, an applicable distance of the positioning assist function is greater than or equal to 20 meters.

Figure 6:
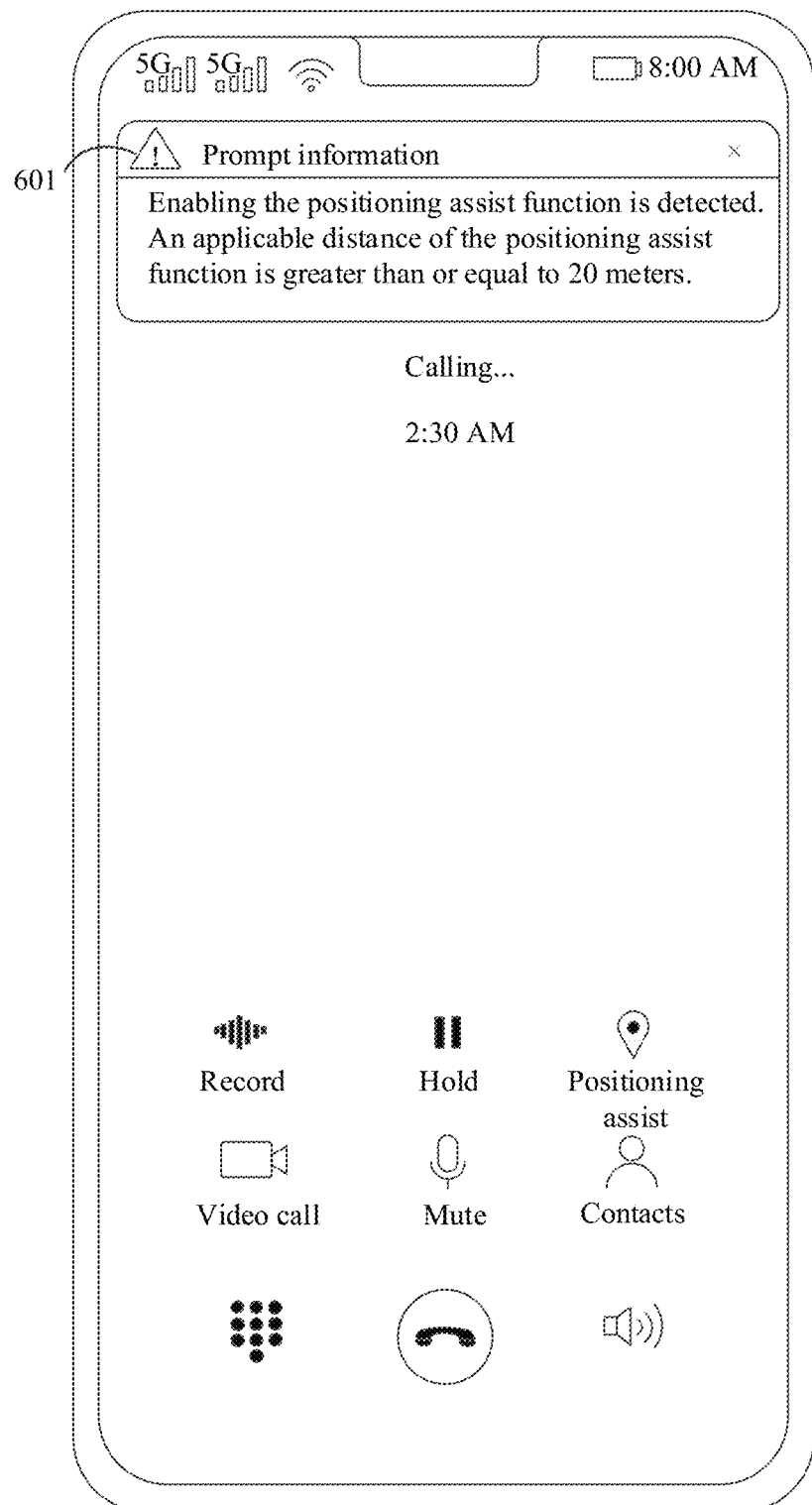
FIG. 6 is a schematic diagram of an interface for prompting a distance according to an embodiment of this application.

For example, FIG. 6 is a schematic diagram of an interface for prompting a distance according to an embodiment of this application. The embodiment corresponding to FIG. 6 is described by using an example in which the terminal device is a mobile phone. This example does not constitute a limitation on this embodiment of this application.

For example, when device A sends, to device B, a call request having a positioning assist function, and device A receives the consent message sent by device B, device A and device B may display the interface shown in FIG. 6. The interface may include prompt information 601. The prompt information 601 may be configured to prompt an applicable condition of the positioning assist function. For example, the prompt information 601 may display the following content; Enabling the positioning assist function is detected. An applicable distance of the positioning assist function is greater than or equal to 20 meters.

It may be understood that because an error between radii of positioning systems in device A and device B is about 2.5 meters to 5 meters, discrimination of human auditory sensation to a sense of azimuth is about 10°. When a distance between two parties of a call is 15 meters, an error of a sense of an azimuth of a human ear is about 18°. In this case, the sense of azimuth can be slightly sensed by a user. Therefore, when the distance between device A and device B exceeds 20 meters, the error of the sense of azimuth is about 11° that can be hardly sensed by the user. It may be understood that when a distance between devices exceeds 20 meters, in a subsequent call process, one party can determine an azimuth of the other party based on voice containing a sense of azimuth.

S304: Device A and device B may obtain, based on azimuth information, a voice call containing spatial azimuth experience.

In this embodiment of this application, the azimuth information may be information obtained by performing device positioning based on a compass, a positioning system, and another function of the device. The voice call containing the spatial azimuth experience may be understood as: Device A and device B may receive the voice having the sense of azimuth through headphones respectively connected thereto. For example, user A faces due north. When hearing voice having low volume in a left headphone body of a headphone and high volume in a right headphone body of the headphone, user A may determine, based on the voice having a sense of azimuth, that user B may be east of user A. The headphone may be a voice receiving device having two or more voice channels. For example, the headphone may be a wired headphone, a Bluetooth headphone, or another headphone that has two voice channels.

In a possible implementation, while receiving the voice having the sense of azimuth, both device A and device B can display a current azimuth in maps of the device A and device B. For example, FIG. 7 is a schematic diagram of an interface for displaying relative positions according to an embodiment of this application.

Figure 7A:
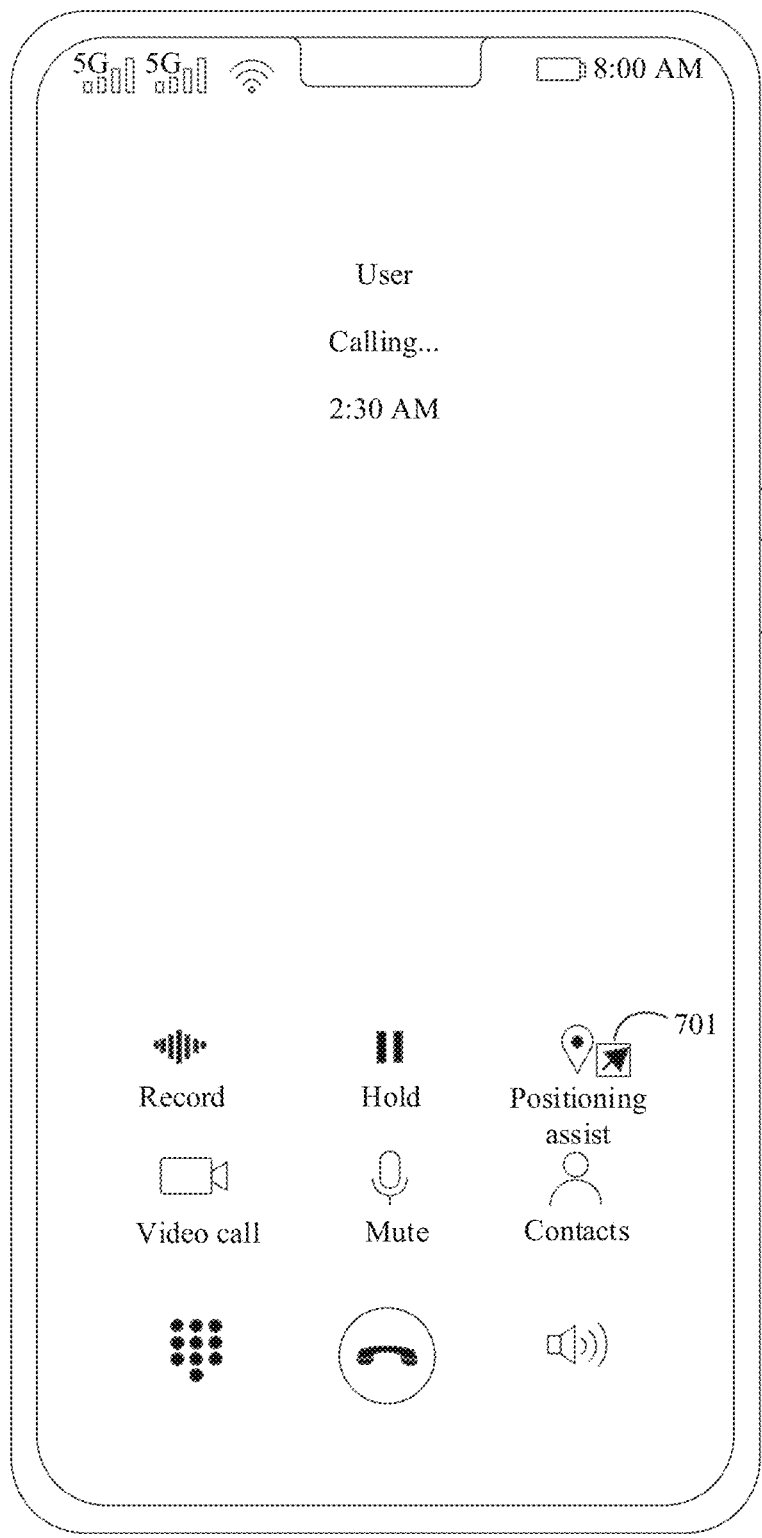
FIG. 7 is a schematic diagram of an interface for displaying relative positions according to an embodiment of this application.
Figure 7B:
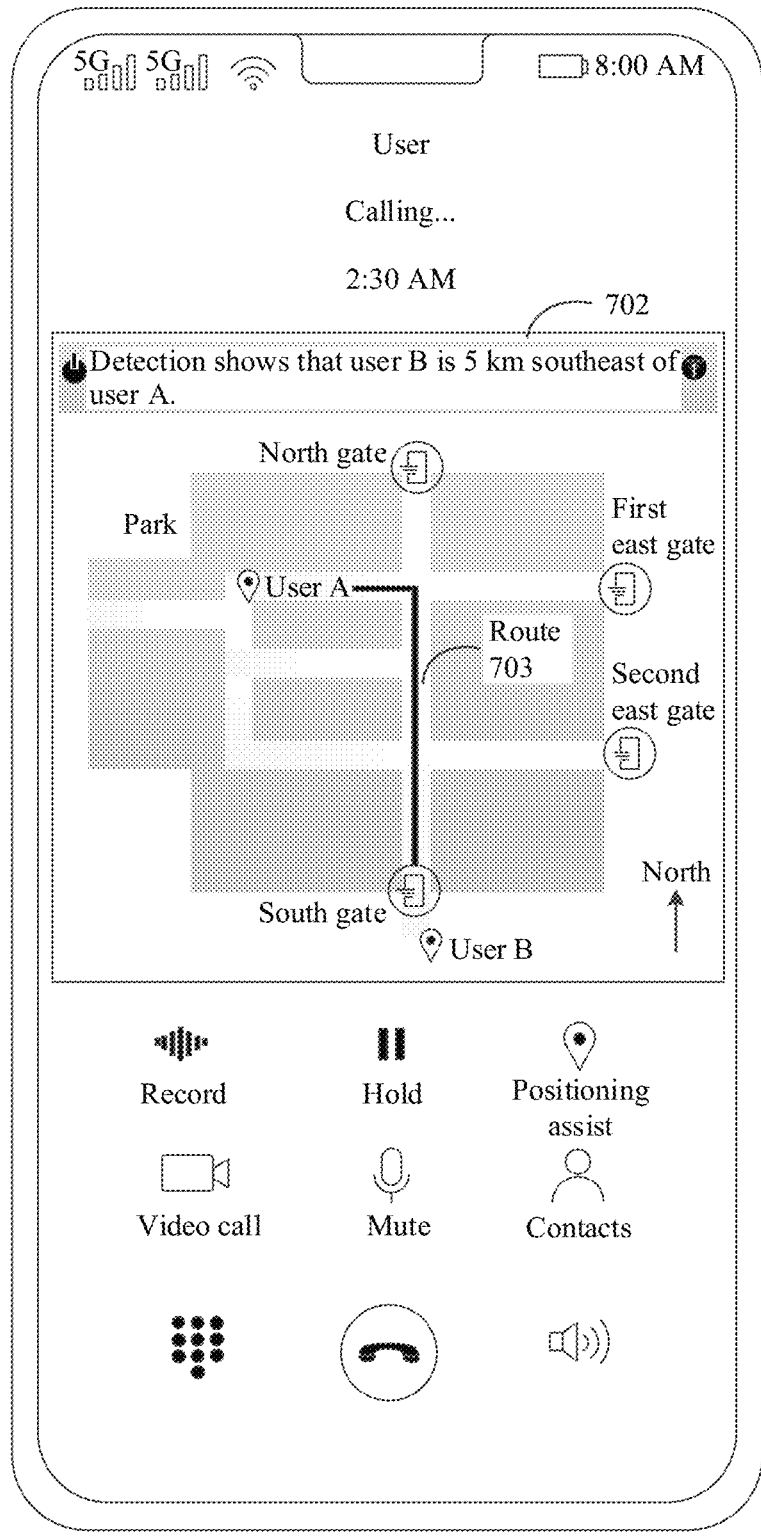

For example, as shown in FIG. 7, when device A and device B obtain azimuth information thereof, and a control corresponding to "Display map" 701 in an interface shown in FIG. 7A is triggered, device A and device B may display an interface shown in FIG. 7B. The interface may include a map 702. The map 702 may display text information containing a relative azimuth between user A and user B and a relative distance between user A and user B, and image information used for representing a relative azimuth between user A and user B. For example, the map 702 may display the following content: "Detection shows that user B is 5 km southeast of user A." The map 702 may further display an image. In this image, user A is inside a park, user B is outside a park, the park may contain a plurality of exits such as a north gate, a first east gate, a second east gate, and a south gate.

Further, when user A ends visiting the park for pleasure, and calls a special car for driving him/or her home, user A may find, based on map information displayed in device A, an exit where user B is, for example, the south gate; or find a route from user A to user B, for example, a route 703.

Based on this, the terminal device may add a spatial cue into the voice call, thereby enhancing user's sense of azimuth during the voice call. For example, when making the voice call to user B, user A can determine an azimuth of user B based on the voice that has the sense of azimuth and that is fed back by a headphone connected to user A's terminal device.

Based on the embodiment corresponding to FIG. 3, in a possible implementation, in step S304, a specific process in which device A and device B obtain, based on the azimuth information, the voice call containing the spatial azimuth experience may include the following steps.

Figure 8:
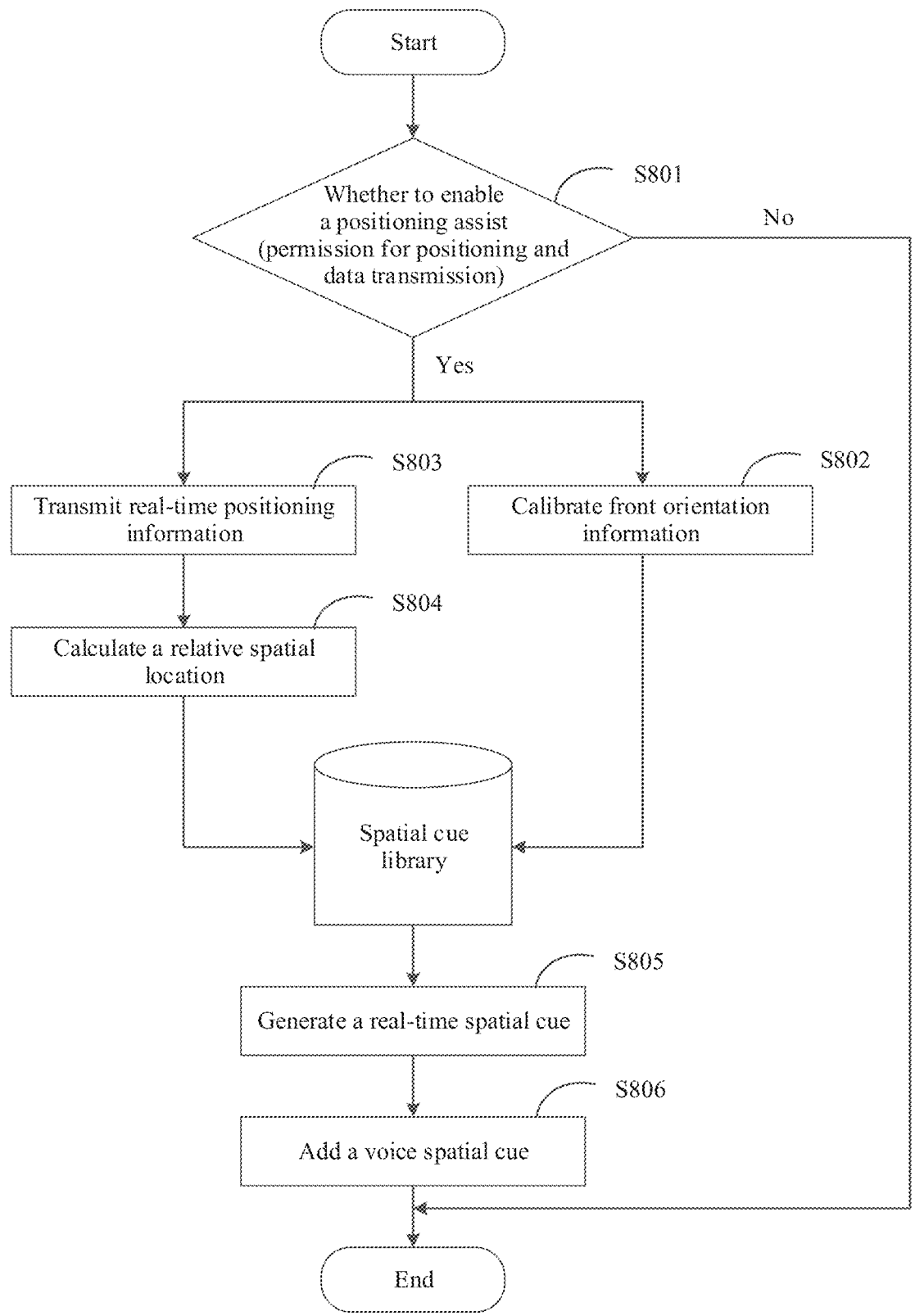
FIG. 8 is a schematic flowchart of another real-time voice call method containing spatial azimuth experience according to an embodiment of this application.

For example. FIG. 8 is a schematic flowchart of another real-time voice call method containing spatial azimuth experience according to an embodiment of this application. As shown in FIG. 8, the method may include the following steps.

S801: A terminal device determines whether a positioning assist function is enabled currently.

In this embodiment of this application, when the terminal device determines that the positioning assist function is enabled currently, both step S802 and step S803 may be performed; or when the terminal device determines that the positioning assist function is not enabled currently, a call may be made according to a normal voice call method. The terminal device may enable the positioning assist function according to step S301.

S802: The terminal device performs front orientation calibration.

In this embodiment of this application. "front orientation" may be understood as an initial direction, for example, a due north direction; and "front orientation calibration" may be understood as real-time tracing of a direction of the terminal device based on an error between a current direction and the initial direction that is used as the due north direction. The terminal device may automatically or manually calibrate the initial direction based on a map, a compass, or the like.

It may be understood that a compass in the terminal device may be implemented by a sensor that responds to the earth's magnetic field, for example, a magnetic sensor. In addition, because horizontal azimuth information is finally determined by mapping differences of longitude and latitude data onto a relative azimuth in a compass, front orientation calibration in an initial state may be configured to provide a start point for an initial azimuth, and provide an azimuth reference for subsequent real-time tracing of front orientation information.

For example. FIG. 9 is a schematic diagram of an interface for front orientation calibration according to an embodiment of this application. The embodiment corresponding to FIG. 9 is described by using an example in which the terminal device is a mobile phone. This example does not constitute a limitation on this embodiment of this application.

Figure 9A:
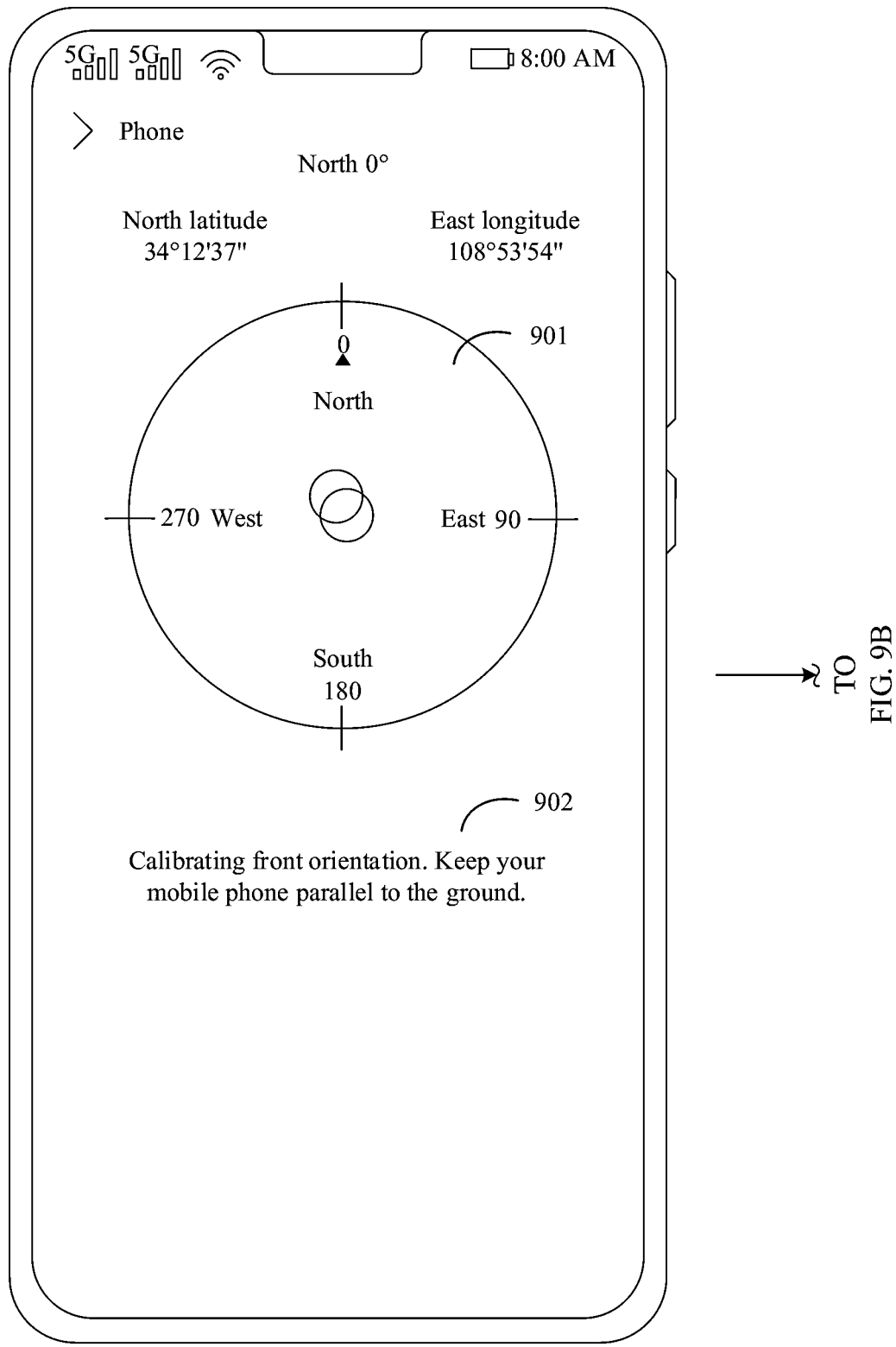
FIG. 9 is a schematic diagram of an interface for front orientation calibration according to an embodiment of this application.

When the mobile phone receives user's operation of enabling a positioning assist function, the mobile phone may display a compass interface that is for front orientation calibration and that is shown in FIG. 9A. The interface may include one or more of the following items: a compass 901 and current azimuth information. The azimuth information may include longitude information, latitude information, north/south pointing information, and the like. The interface may further include prompt information 902. The prompt information 902 may display the following content: Calibrating front orientation. Keep your mobile phone parallel to the ground. When the mobile phone receives user's operations of keeping the mobile phone parallel to the ground according to the prompt information 902 and pointing the mobile phone north, the mobile phone may display the following content: A current initial direction is north 0°, and an azimuth is 34° 12'37" north latitude and 108°53'54" east longitude.

Figure 9B:
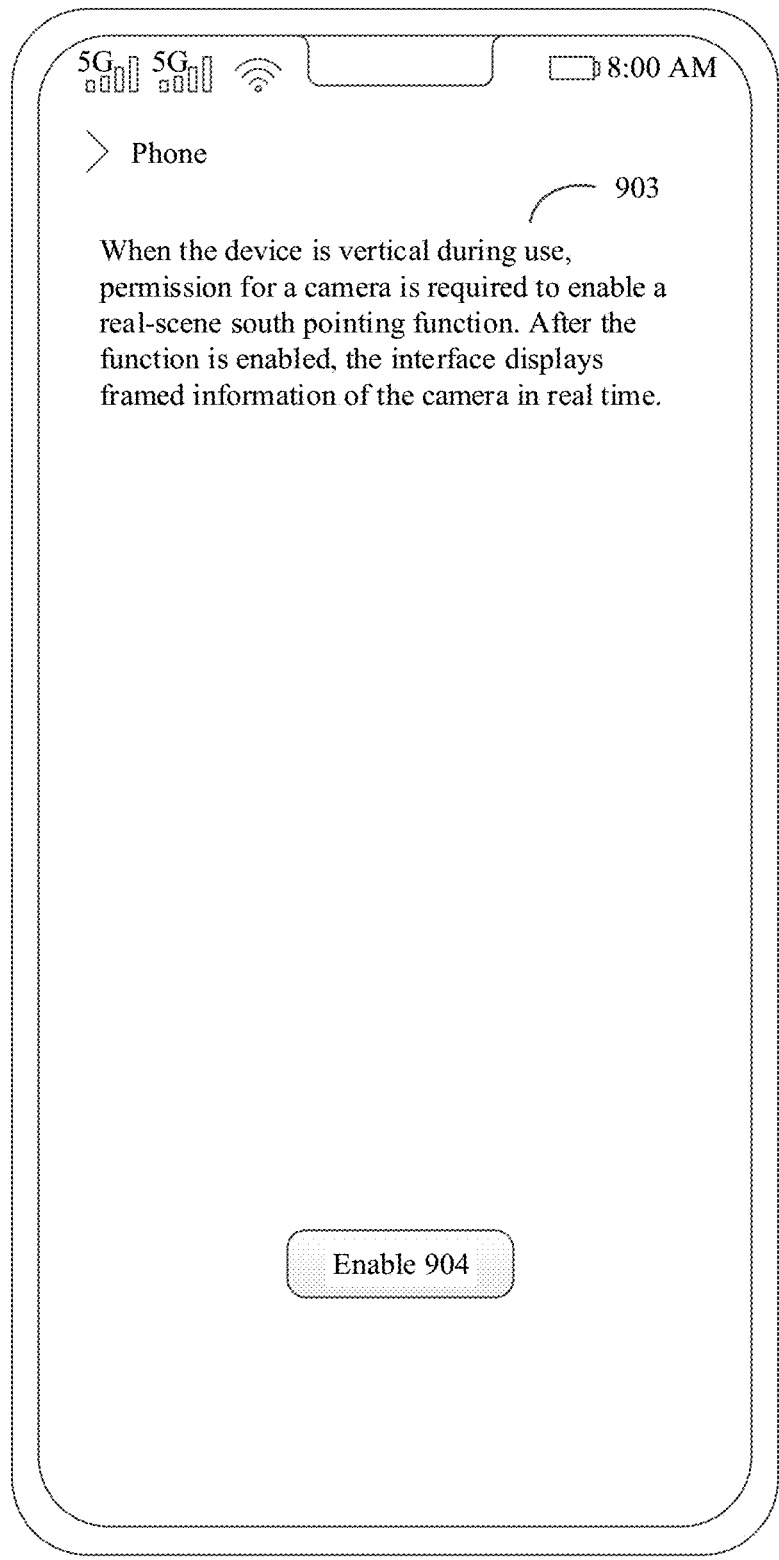

Alternatively, when the mobile phone receives user's operation of holding the mobile phone vertically, the terminal device may switch from an interface shown in FIG. 9A to an interface shown in FIG. 9B. Referring to the interface shown in FIG. 9B, the interface may display prompt information 903. The prompt information 903 may display the following content: When the device is vertical during use, permission for a camera is required to enable a real-scene south pointing function. After the function is enabled, the interface displays framed information of the camera in real time. Then, the user may hold the mobile phone vertically, and perform front orientation calibration on the interface shown in FIG. 9B.

Figure 10:
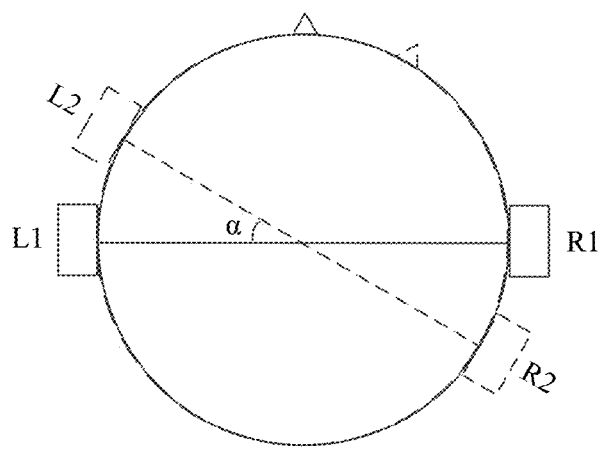
FIG. 10 is a schematic diagram of real-time correction of front orientation information according to an embodiment of this application.

Further, the terminal device may also perform real-time tracing on the front orientation information. For example. FIG. 10 is a schematic diagram of real-time correction of front orientation information according to an embodiment of this application. The embodiment corresponding to FIG. 10 is described by using an example in which the terminal device is a mobile phone. This example does not constitute a limitation on this embodiment of this application.

For example, during people's daily calls or activities, a head may turn or deviate; or a user may turn in a walk. In this case, the azimuth information received by the terminal device may be synchronously corrected in real time based on an offset degree relative to the initial direction.

In an implementation, when both user A and user B wear headphones during a voice call, face due north, and stand still, sensors that are in a left headphone body and a right headphone body and that are connected to device A, for example, location sensors or acceleration sensors, may detect that user A's head is currently at an azimuth corresponding to L1-R1, as shown in FIG. 10. The sensors in the left headphone body and the right headphone body may send to device A, information about the azimuth corresponding to L1-R1. Then, device A may calculate a relative location between an azimuth of user B's head and the azimuth that corresponds to L1-R1 and where user A's head is located currently. Subsequently, device A may query a spatial cue library for a spatial cue corresponding to the relative location between user B's head and user A's head, and then process received user B's voice based on the spatial cue, to obtain voice that is of user B and that has a sense of azimuth. For example, at that moment, user A may sense, based on user B's voice, that user B is at the west side of user A.

When a deflection angle that is of user A's head and that is received by the sensors in the left headphone body and the right headphone body is greater than an angle threshold, the sensors in the left headphone body and the right headphone body may detect that user A's head currently deflects to an azimuth corresponding to L2-R2, and send, to device A, information about the azimuth corresponding to L2-R2. Device A receives information about a change of an azimuth of user A's head, and calculates a relative location of an azimuth of user B's head and the azimuth that corresponds to L2-R2 and where user A's head is located at that moment. A currently relative location between user A's head and user B's head is different from a relative location between user A's head and user B's head before user A's head deflects. For example, an angle between the azimuth corresponding to L2-R2 and the azimuth corresponding to L1-R1 may be α. Subsequently, device A may sense, according to the above method, voice that is of user B and that is different from voice of user B obtained before user A's head deflects. For example, if user A's head deflects right by 90 degrees, user A may sense, based on user B's voice, that user B is behind user A.

It may be understood that device A may also send, to device B, information about the azimuth corresponding to L2-R2 when user A's head deflects. Then, device B may calculate a relative location of an azimuth corresponding to user B's head and the azimuth corresponding to L2-R2 where user A's head is, obtain a spatial cue based on the relative location, and receive voice that is of user A and that has a sense of azimuth.

In another implementation, when both user A and user B wear headphones during a voice call, face due north, and stand still, a sensor in device A, for example, a location sensor or an acceleration sensor, may detect a current azimuth of user A. Then, device A may calculate a relative location of the current azimuth of user A and an azimuth of user B, subsequently query a spatial cue library for a spatial cue corresponding to a relative location between user B and user A, and then process received user B's voice based on the spatial cue, to obtain voice that is of user B and that has a sense of azimuth. For example, at that moment, user A may sense, based on user B's voice, that user B is at the west side of user A.

When the sensor in device A receives information indicating that user A walks in a north direction and turns east, and an azimuth angle of movement of user A is greater than an angle threshold, the sensor in device A may detect that an azimuth of user A changes currently. Then, device A may calculate a relative location of an azimuth of user B and the azimuth of user A when user A turns. A relative location between user A and user B at that moment is different from a relative location between user A and user B before user A turns. Subsequently, device A may sense, according to the above method, voice that is of user B and that is different from voice of user B obtained before user A turns. For example, if user A walks in a north direction and turns east, user A may sense, based on user B's voice, that user B is at the southeast side of user A.

Further, when the sensor in device A receives information indicating that user A walks in an east direction and turns north, and an azimuth angle of movement of user A is greater than an angle threshold, device A may further sense user B's voice according to the above method. For example, if user A walks in an east direction and turns north, user A may sense, based on user B's voice, that user B is at the southwest side of user A.

It may be understood that device A may also send, to device B, information about an azimuth of user A when user A turns. Device B may calculate a relative location of the azimuth of user A and an azimuth of user B, obtain a spatial cue based on the relative location, and receive voice that is of user A and that has a sense of azimuth.

S803: The terminal device transmits real-time information.

In this embodiment of this application. The real-time information may be used to determine relative azimuth between at least two terminal devices in real time, and may include information such as roles, latitudes, longitudes, and elevations of the terminal devices. For example, the roles of the terminal device may include a calling person and a called person. The calling person may be understood as a user making a voice call containing a positioning assist function. The called person may be understood as a user participating in the voice call made by the calling person.

S804: The terminal device calculates a relative spatial location.

In this embodiment of this application, the terminal device may determine the relative location between the calling person and the called person based on the difference that is between real-time information of the calling person and real-time information of the called person and that is obtained in step S803.

It may be understood that generally, absolute numbers of a difference between actual longitudes of the called person and the calling person and a difference between actual latitudes of the called person and the calling person are very small. Therefore, normalized mapping in a certain direction needs to be performed based on a linear distance, a longitude difference, and a latitude difference between the called person and the calling person, to better determine a direction of voice of a peer end.

Figure 11:
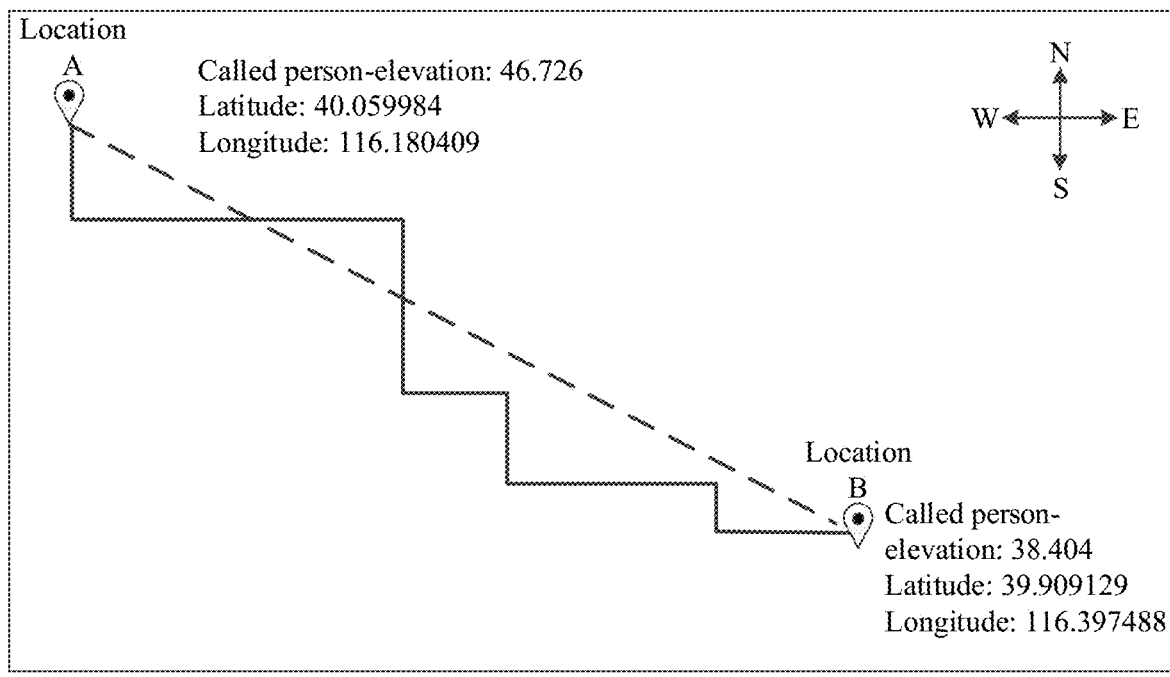
FIG. 11 is a schematic diagram of a longitude, a latitude, and a relative azimuth according to an embodiment of this application.

For example, FIG. 11 is a schematic diagram of a longitude, a latitude, and a relative azimuth according to an embodiment of this application. As shown in FIG. 11, the called person is located at place A that may have an elevation of 46.726 meters, a latitude of 40.059984, and a longitude of 116.180409; and the calling person is located at place B that may have an elevation of 38.404 meters, a latitude of 39.909129, and a longitude of 116.397488. The terminal device may determine, based on the latitudes, longitudes, elevations, and other information that are of the calling person and the called person and that are shown in FIG. 11, that the called person is at the northwest side of the calling person. When the called person faces due north, voice of the calling person may be in a southeast direction behind the called person.

Figure 12:
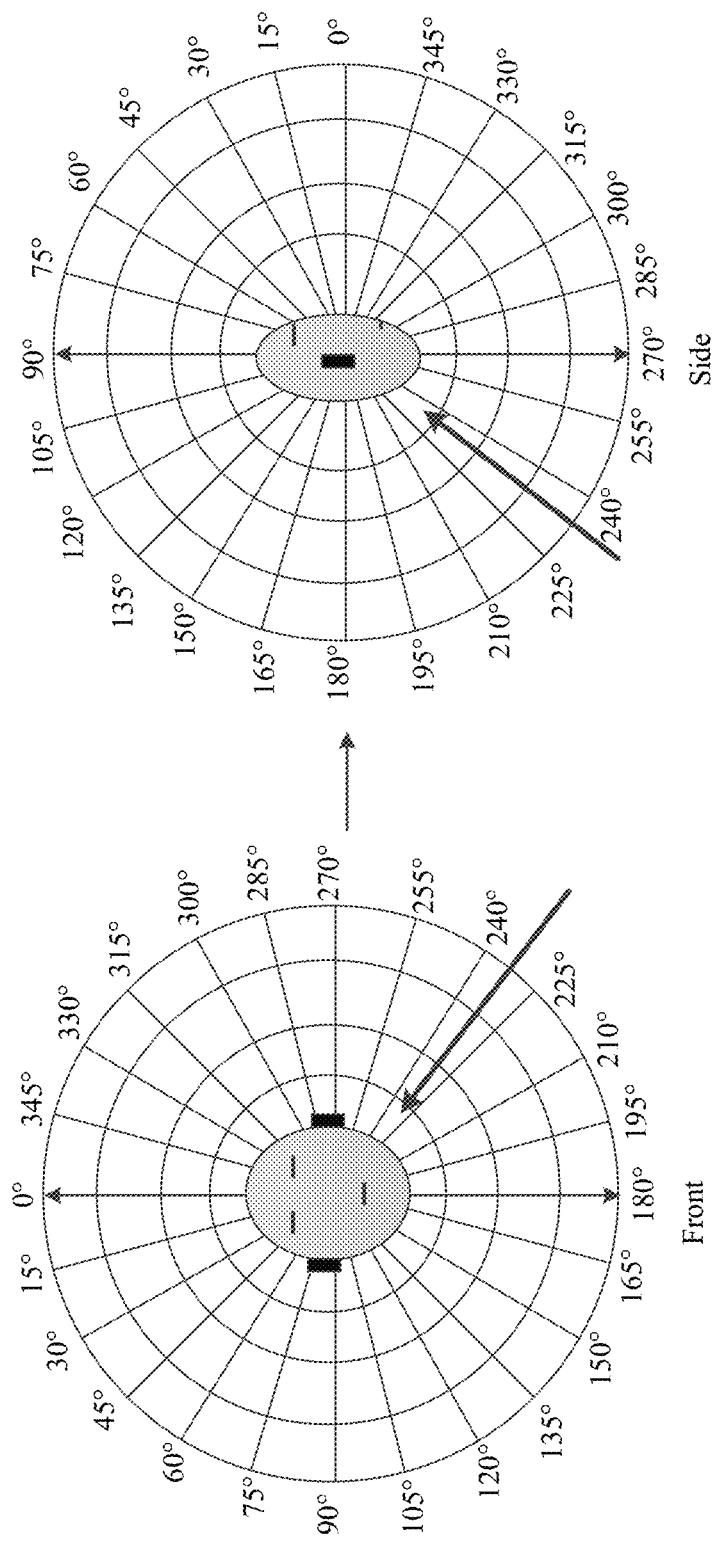
FIG. 12 is a schematic diagram of an azimuth and an orientation of voice according to an embodiment of this application.

For example. FIG. 12 may be a schematic diagram of an azimuth and an orientation of voice according to an embodiment of this application. As shown in Front of FIG. 12, when the calling person faces forward, voice of the called person may come from a location at a left side of the calling person; and as shown in Side of FIG. 12, when the calling person turns his/her head to one side, voice of the called person may be come from a location at a right rear side of the calling person. It may be understood that when turning or deflecting his/her head, the calling person can sense that voice of the called person is also adjusted based on an offset degree, relative to a forward direction of the head of the calling person.

S805: The terminal device generates a real-time spatial cue by using a spatial cue library.

In this embodiment of this application, the spatial cue library may be used to obtain a binaural cue corresponding to the azimuth information and/or a monoaural cue corresponding to the azimuth information. For example, a binaural cue statistical model and a monoaural cue statistical model may be trained by using a neural network algorithm, a mathematical model, or another method. Then, the spatial cue library is generated based on input information and output information of the models.

Figure 13:
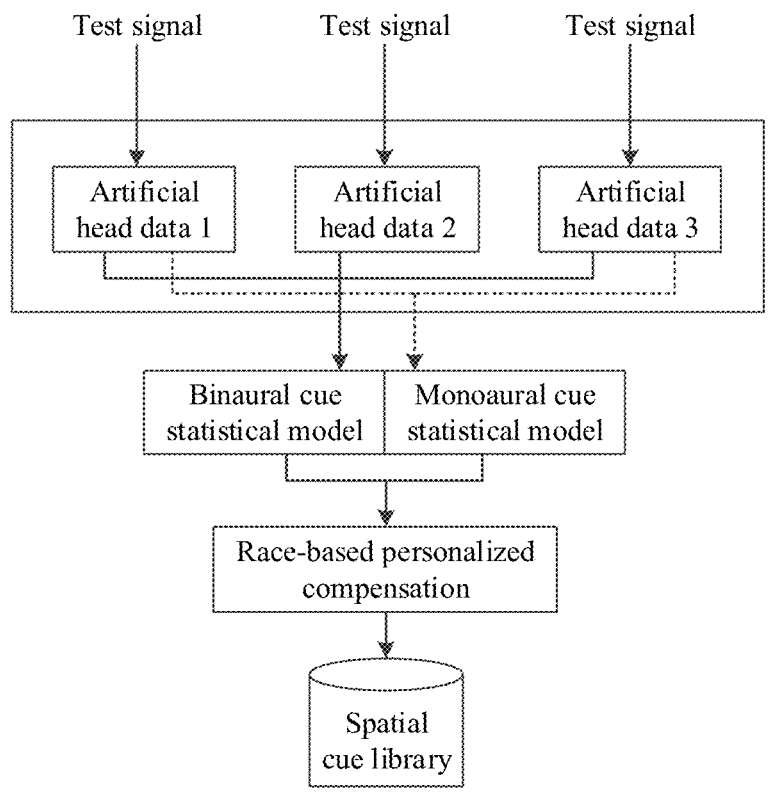
FIG. 13 is a schematic flowchart of generating a spatial cue library according to an embodiment of this application.

For example. FIG. 13 is a schematic flowchart of generating a spatial cue library according to an embodiment of this application. In the embodiment corresponding to FIG. 13, because different users have different biological characteristics, a spatial cue library including correspondences between azimuths of artificial heads, and monoaural cues and binaural cues may be established based on a large amount of standard artificial head data.

As shown in FIG. 13, the terminal device may obtain various pieces of existing artificial head data, and use a mean value of the various pieces of artificial head data as standard artificial head data. As shown in FIG. 13, when a test signal is input, the terminal device may use a mean value of artificial head data 1, artificial head data 2, artificial head data 3, and the like as the standard artificial head data, and train the binaural cue statistical model and the monoaural cue statistical model based on the standard artificial head data. Further, the terminal device may perform personalized compensation on the standard artificial head data based on a difference between biological characteristics of users in different regions, to obtain analog artificial head data that is more approximate to data of a real user. Subsequently, after inputting azimuth information into the spatial cue library, the terminal device may obtain a real-time spatial cue corresponding to the azimuth information. The real-time spatial cue may include a binaural cue and a monoaural cue.

It may be understood that when the terminal device detects that an azimuth that is relative to an initial location and that is of a user changes because a head deflection angle or a body turning angle of the user is greater than an angle threshold, a spatial cue that corresponds to the real-time azimuth information and that is obtained by using the spatial cue library may be different. Therefore, voice on which the spatial cue is superposed is different from voice in an initial state. In addition, the voice is stereoscopic, which helps the terminal device sense an azimuth change of the peer end user.

It may be understood that a type of the artificial head data and a generation method of the spatial cue library may include other content based on actual scenarios. This is not limited in this embodiment of this application.

S806: The terminal device performs voice spatial cue superposition.

In this embodiment of this application, the voice spatial cue superposition may be used to superpose, onto a voice call, a real-time spatial cue obtained from the spatial cue library. The voice call may be a double-channel voice call.

Based on this, the terminal device can add a spatial cue into a voice call, so that both parties of the call can determine each other's azimuth based on each other's voice.

Based on the embodiment corresponding to FIG. 8, in a possible implementation, a specific process in which the terminal device performs voice spatial cue superposition in step S806 may include the following steps. For example, FIG. 14 is a schematic flowchart of superposing a spatial cue according to an embodiment of this application.

Figure 14:
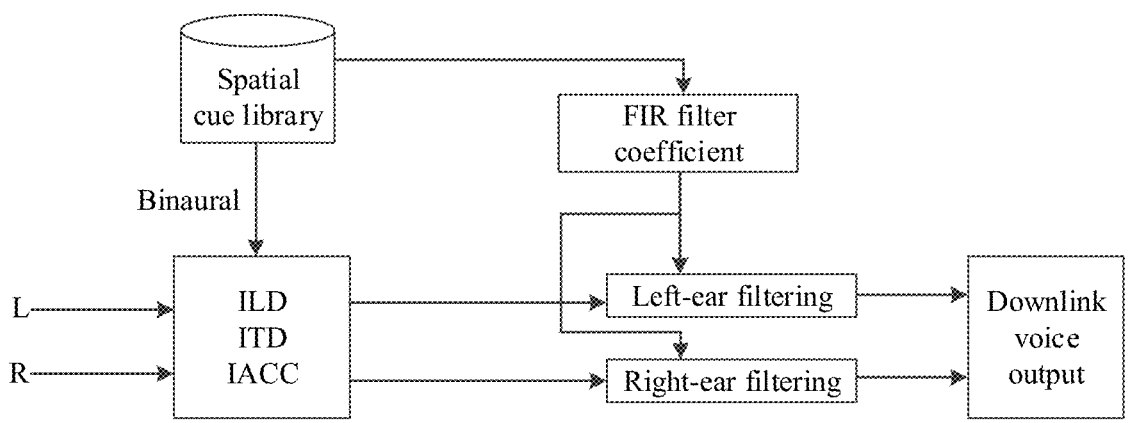
FIG. 14 is a schematic flowchart of superposing a spatial cue according to an embodiment of this application.

As shown in FIG. 14, the terminal device may perform superposition on voice in a left channel and that in a right channel by using an ILD and an ITD, respectively.

In this embodiment of this application, a calculation formula of an ITD at a corresponding azimuth may be:

$$ITD(\theta s) = \frac{a}{c}(\sin \theta s + \theta s), 0 \le \theta s \le \frac{\pi}{2},$$

where a is a constant, for example, a may be 0.0875 m; and c may be a speed of voice, and a forward incident angle is θs. It may be understood that when the forward incident angle θs is 0°), the ITD may also be 0.

Figure 15:
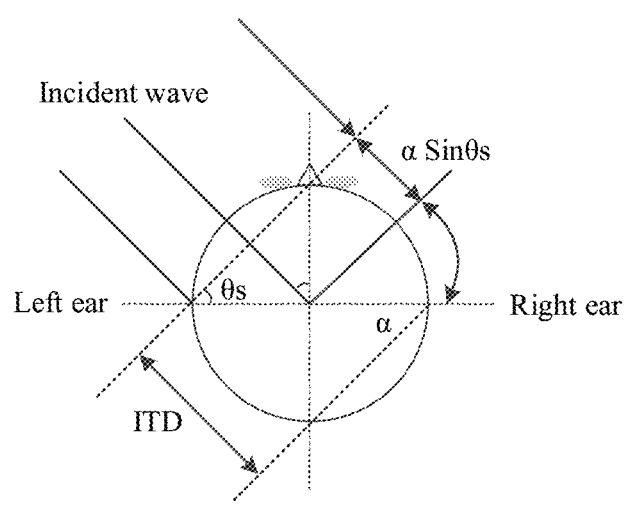
FIG. 15 is a schematic diagram of calculating an interaural time difference according to an embodiment of this application.

For example, the terminal device obtains, based on the above calculation formula of the ITD, voice signals that are in the left channel and the right channel and on which the interaural time difference is added. FIG. 15 is a schematic diagram of calculating an interaural time difference according to an embodiment of this application.

As shown in FIG. 15, when a voice source is in a left front direction, an angle between the direction of the voice source and a forward direction is θs, and ITD(θs)=τ, the voice signals that are in the left channel and the right channel and on which the interaural time difference is added may be:

$$pL(t) = [1 + m\cos 2\pi f_m t]\cos(2\pi f_c t)$$

and $$pR(t) = \{1 + m\cos[2\pi f_m(t - \tau)]\}\cos(2\pi f_c),$$

where pL(t) denotes the voice signal in the left channel, pR(t) denotes the voice signal in the right channel, $f_m$ denotes a modulation frequency, $f_c$ denotes a signal frequency, and m denotes a modulation index.

In this embodiment of this application, when ILD(θs)=xdB, a level difference between the signals in the left channel and the right channel may be:

$$pL(t) = pL(t) + x.$$

As shown in FIG. 14, further, the terminal device may perform filtering on voice in the left channel and that in the right channel by using an FIR filter coefficient. In this embodiment of this application, an FIR filter coefficient corresponding to azimuth information may be obtained from the spatial cue library.

Based on this, the terminal device can add a spatial cue into a voice call, so that both parties of the call can determine each other's azimuth based on each other's voice.

Figure 16:
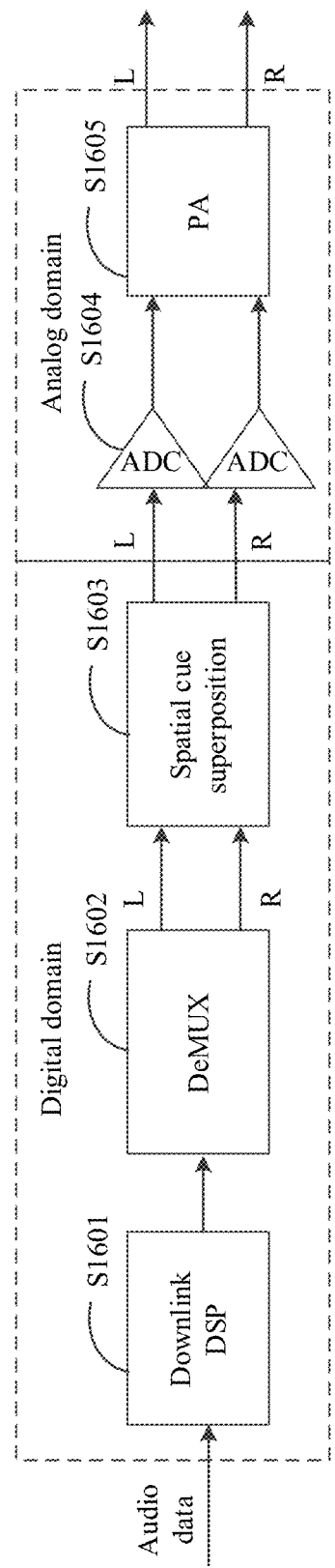
FIG. 16 is a schematic flowchart of a call downlink according to an embodiment of this application.

Based on the embodiment corresponding to FIG. 8, in a possible implementation, a location of the spatial cue superposition in a call downlink may be as shown in FIG. 16. For example, FIG. 16 is a schematic flowchart of a call downlink according to an embodiment of this application. As shown in FIG. 16, the process may include the following steps.

S1601: A terminal device performs downlink digital signal processing (digital signal processing, DSP) on audio data received from an antenna of the terminal device or a network.

S1602: The terminal device inputs, into a demultiplexer (demultiplexer, DeMUX), audio data obtained after the DSP.

The DeMUX is configured to map monophonic audio data onto double channels.

S1603: The terminal device performs spatial cue superposition on a left-channel signal and a right-channel signal that are output by the DeMUX.

S1604: The terminal device inputs, into an analog-to-digital converter (analog-to-digital converter, ADC), a left-channel signal and a right-channel signal that are obtained after the spatial cue superposition.

S1605: The terminal device inputs, into a power amplifier (power amplifier, PA), signals output by the ADC, to obtain a voice signal having a sense of azimuth.

It may be understood that downlink DSP. DeMUX-based processing, and spatial cue superposition may be processing steps in a digital domain; and ADC-based processing and PA-based processing may be processing steps in an analog domain.

Based on this, the terminal device can superpose a spatial cue into a voice call, so that both parties of the call can determine each other's azimuth based on each other's voice.

It may be understood that a voice call method provided in the embodiments of this application may be applied to a conventional voice call or Internet protocol (internet protocol. IP)-based voice over Internet protocol (voice over internet protocol. VoIP).

It may be understood that a voice call method provided in the embodiments of this application may be applied to a voice call scenario, or applied to an augmented reality (augmented reality. AR) scenario, a virtual reality (virtual reality. VR) scenario, or another scenario that uses a multi-channel play back device, so that the terminal device can output, based on the multi-channel playback device, voice that is finer and more natural, and has a stronger sense of space.

It may be understood that the interface described in this embodiment of this application is merely used as an example, but does not constitute a further limitation on the embodiments of this application.

Figure 17:
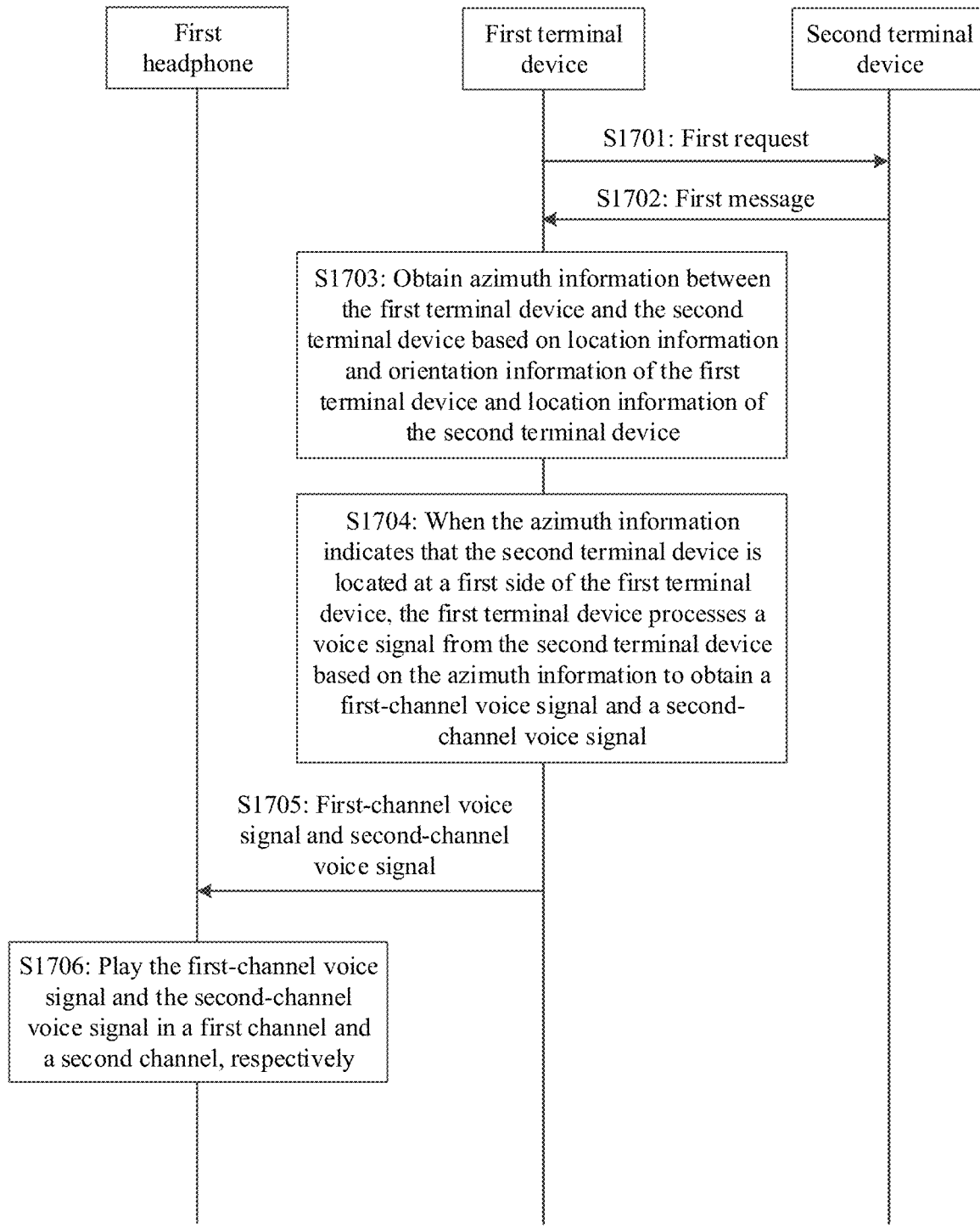
FIG. 17 is a schematic flowchart of a voice call method according to an embodiment of this application.

Based on the content described in the above embodiments, to better understand the embodiments of this application, for example. FIG. 17 is a schematic flowchart of a voice call method according to an embodiment of this application.

As shown in FIG. 17, the voice call method may include the following steps.

S1701: A first terminal device sends a first request to a second terminal device.

In this embodiment of this application, the first request is used to request location information of the second terminal device.

S1702: The second terminal device sends a first message to the first terminal device.

In this embodiment of this application, the first message contains the location information of the second terminal device.

S1703: The first terminal device obtains azimuth information between the first terminal device and the second terminal device based on location information and orientation information of the first terminal device and the location information of the second terminal device.

In this embodiment of this application, the orientation information may be information about a direction determined by the first terminal device based on the front orientation calibration in S802. For determining of the azimuth information, refer to description of determining the azimuth information in S304. Details are not described herein again.

S1704: When the azimuth information indicates that the second terminal device is located at a first side of the first terminal device, the first terminal device processes a voice signal from the second terminal device based on the azimuth information to obtain a first-channel voice signal and a second-channel voice signal.

In this embodiment of this application, the first-channel voice signal and the second-channel voice signal may be signals that correspond to two ears and onto which a voice cue is superposed. For a process of superposing the voice cue to obtain the first-channel voice signal and the second-channel voice signal, refer to step S806. Details are not described herein again.

S1705: The first terminal device sends the first-channel voice signal and the second-channel voice signal to a first channel and a second channel of the first headphone, respectively.

In this embodiment of this application, the first headphone includes a first earpiece and a second earpiece, the first earpiece corresponds to the first channel, and the second earpiece corresponds to the second channel.

S1706: The first headphone plays the first-channel voice signal and the second-channel voice signal in the first channel and the second channel, respectively.

Based on this, a user can sense an azimuth status of a peer end during a voice call based on the voice signals fed back by the first headphone connected to the first terminal device, thereby enriching content of the voice call.

Optionally, the first side corresponds to the first channel of the first headphone, and a signal strength of the first-channel voice signal is greater than that of the second-channel voice signal.

Optionally, a time delay of the first-channel voice signal is less than that of the second-channel voice signal.

Optionally, before S1701, the first terminal device may further display a first interface. The first interface may be an interface shown in FIG. 4A. Referring to the interface shown in FIG. 4A, a first control in the first interface may be "Call positioning assist" 403. A first operation may be an operation of selecting "Call positioning assist" 403. A first function may be a function that is enabled by triggering "Call positioning assist" 403 and that is used to assist in positioning during a voice call.

Optionally, the first interface may further display a first pop-up window. Referring to the interface shown in FIG. 4A, the first pop-up window may be a call option 401; a second control may be "Call" 402; and a third control may be "Edit before call" 406.

Optionally, S1702 may include: displaying, by the second terminal device, a second interface in response to the first request. The second interface may be an interface shown in FIG. 4B. Referring to the interface shown in FIG. 4B, a fourth control in the second interface may be "Accept positioning assist" 405. A second operation may be an operation of selecting "Accept positioning assist" 405.

Optionally, the second terminal device may further display a third interface in response to the second operation. The third interface may be an interface shown in FIG. 9A. The interface includes a compass 901. The third operation may be an operation of azimuth calibration based on the compass 901.

Optionally, the second terminal device may further display first prompt information. The first prompt information may be prompt information 601 in an interface shown in FIG. 6.

Optionally, before S1701, the first terminal device may further display a fourth interface. The fourth interface may be an interface shown in FIG. 5A. Referring to the interface shown in FIG. 5A, a fifth control in the fourth interface may be "Positioning assist" 501. A fourth operation may be an operation of selecting "Positioning assist" 501.

Optionally, the fourth interface may include another control. Referring to the interface shown in FIG. 5A, a sixth control may be a recording control; a seventh control may be a waiting control; an eighth control may be a video call making control; a ninth control may be a muting control; and a tenth control may be a contact viewing control.

Optionally, S1702 may include: displaying, by the second terminal device, second prompt information in response to the first request. The second prompt information may be prompt information 502 in an interface shown in FIG. 5B. Referring to the interface shown in FIG. 5B, an eleventh control may be a control corresponding to "Yes" 503 in the prompt information 502; a twelfth control may be a control corresponding to "No" in the prompt information 502; and a fifth operation may be an operation of triggering "Yes" 503.

Optionally, a voice call interface of the first terminal device may further include a thirteenth control. The voice call interface of the first terminal device may be an interface shown in FIG. 7A. Referring to the interface shown in FIG. 7A, the thirteenth control may be "Display map" 701; and a sixth operation may be an operation of triggering "Display map" 701.

Further, the first terminal device may further display a map interface in the voice call interface in response to the sixth operation. The map interface may be an interface corresponding to the map 702 in the interface shown in FIG. 7B. Referring to the interface shown in FIG. 7B, the map 702 may display a location of the first terminal device (for example, user A), a location of the second terminal device (for example, user B), and a route between the two terminal devices, for example, a route 703.

Optionally, S1703 may include: querying, by the first terminal device, a preset spatial cue library for a spatial cue corresponding to the azimuth information, where the spatial cue library includes a plurality of correspondences; any of the correspondences includes azimuth information and a spatial cue corresponding to the azimuth information; the spatial cue includes a binaural cue and a monoaural cue; the binaural cue is used to reflect a change of voice in a horizontal direction, and includes an interaural level difference (ILD) and an interaural time difference (ITD); and the monoaural cue is used to reflect a change of the voice in a vertical direction; mapping, by the first terminal device, the voice signal onto a first source signal corresponding to the first channel and a second source signal corresponding to the second channel; superposing, by the first terminal device, the Voice ITD onto the second source signal to obtain a superposed second source signal; superposing, by the first terminal device, the Voice ILD onto the first source signal to obtain a superposed first source signal; and generating, by the first terminal device, a filter coefficient by using the monoaural cue, and separately performing filtering on the superposed first source signal and the superposed second source signal based on the filter coefficient, to obtain the first-channel voice signal and the second-channel voice signal.

Figure 18:
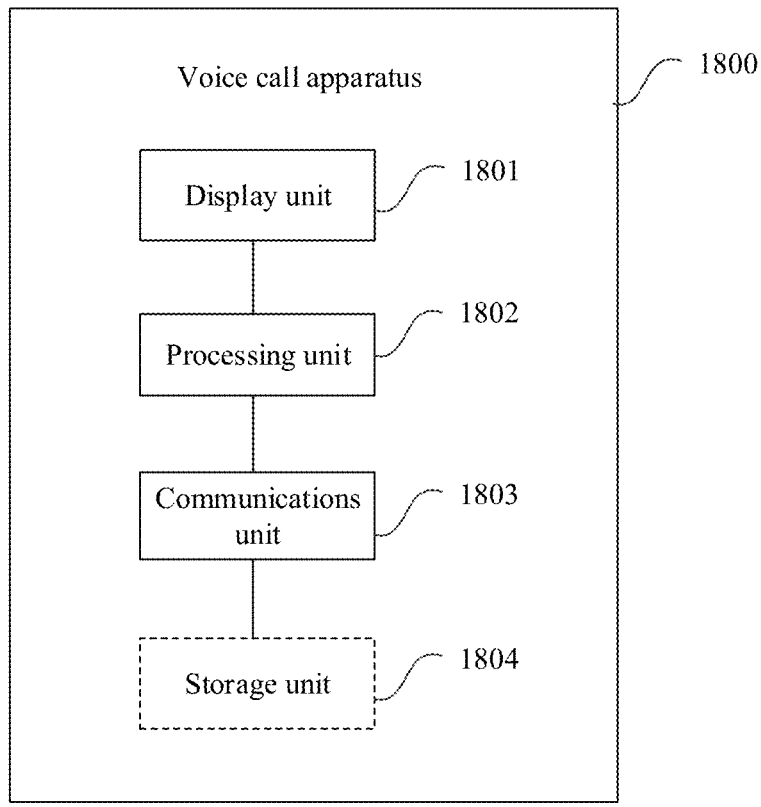
FIG. 18 is a schematic structural diagram of a voice call apparatus according to an embodiment of this application.

The method provided in the embodiments of this application is described above with reference to FIG. 3 to FIG. 17. An apparatus used for executing the above method and provided in the embodiments of this application is described below. As shown in FIG. 18. FIG. 18 is a schematic structural diagram of a voice call apparatus according to an embodiment of this application. The voice call apparatus may be the terminal device in the embodiments of this application or a chip or chip system in the terminal device.

As shown in FIG. 18, the voice call apparatus 1800 may be applied to a communications device, a circuit, a hardware component, or a chip, and includes a display unit 1801, a processing unit 1802, and a communications unit 1803. The display unit 1801 is configured to support a display step performed in the voice call method. The processing unit 1802 is configured to support a voice call apparatus to perform an information processing step. The communications unit 1803 is configured to support the voice call apparatus to perform a data sending or receiving step.

Specifically, an embodiment of this application provides a voice call apparatus. The voice call apparatus is applied to a voice call system that includes a first terminal device, a second terminal device, and a first headphone connected to the first terminal device. The voice call apparatus includes: a communications unit 1803, configured to: send a first request to a second terminal device, where the first request is used to request location information of the second terminal device; and send a first message to the first terminal device, where the first message contains the location information of the second terminal device; and a processing unit 1802, configured to: obtain azimuth information between the first terminal device and the second terminal device based on location information and orientation information of the first terminal device and the location information of the second terminal device; and when the azimuth information indicates that the second terminal device is located at a first side of the first terminal device, process a voice signal from the second terminal device based on the azimuth information to obtain a first-channel voice signal and a second-channel voice signal. The communications unit 1803 is further configured to send the first-channel voice signal and the second-channel voice signal to a first channel and a second channel of the first headphone, respectively, where the first headphone includes a first earpiece and a second earpiece, the first earpiece corresponds to the first channel, and the second earpiece corresponds to the second channel. The processing unit 1802 is further configured to play the first-channel voice signal and the second-channel voice signal in the first channel and the second channel, respectively.

In a possible implementation, the first side corresponds to the first channel of the first headphone, and a signal strength of the first-channel voice signal is greater than that of the second-channel voice signal.

In a possible implementation, a time delay of the first-channel voice signal is less than that of the second-channel voice signal.

In a possible implementation, the display unit 1801 is specifically configured to display a first interface, where the first interface is an interface used for calling the second terminal device, and includes a first control; and the processing unit 1802 is specifically configured to receive a first operation of selecting the first control; and the processing unit 1802 is further specifically configured to enable a first function in response to the first operation, where the first function is used to assist in positioning during a voice call.

In a possible implementation, the first interface further displays a first pop-up window; and the first pop-up window displays, in a form of a list, the first control, a second control used for making a call, and a third control used for editing a number before calling the number.

In a possible implementation, the display unit 1801 is specifically configured to display a second interface in response to the first request, where the second interface is an interface used for prompting a voice call, and includes a fourth control; and the communications unit 1803 is specifically configured to send the first message to the first terminal device when the second terminal device receives, within a first time threshold, a second operation of triggering the fourth control.

In a possible implementation, the display unit 1801 is specifically configured to display a third interface in response to the second operation, where the third interface is used to determine an initial azimuth of the second terminal device, and displays a compass used for indicating an azimuth; the processing unit 1802 is specifically configured to receive, in the third interface, a third operation used for azimuth calibration; and the communications unit 1803 is specifically configured to send the first message to the first terminal device in response to the third operation.

In a possible implementation, the display unit 1801 is further configured to display first prompt information, where the first prompt information is used to prompt an applicable range of the first function.

In a possible implementation, the display unit 1801 is specifically configured to display a fourth interface, where the fourth interface is an interface of a voice call, and includes a fifth control; the processing unit 1802 is specifically configured to receive a fourth operation of selecting the fifth control; and the processing unit 1802 is further specifically configured to enable a first function in response to the fourth operation, where the first function is used to assist in positioning during a voice call.

In a possible implementation, the fourth interface further displays a sixth control used for recording, a seventh control used for voice on hold, the fifth control, an eighth control used for making a video call, a ninth control used for muting, and a tenth control used for viewing a contact.

In a possible implementation, the display unit 1801 is further configured to display second prompt information in response to the first request, where the second prompt information includes an eleventh control and a twelfth control; and the communications unit 1803 is specifically configured to send the first message to the first terminal device when the second terminal device receives, within a second time threshold, a fifth operation of triggering the eleventh control.

In a possible implementation, a voice call interface of the first terminal device further includes a thirteenth control; the processing unit 1802 is further configured to receive a sixth operation of triggering the thirteenth control; and the display unit 1801 is further configured to display a map interface in the voice call interface in response to the sixth operation, where the map interface includes locations of the first terminal device and the second terminal device, and a route from the first terminal device to the second terminal device.

In a possible implementation, the processing unit 1802 is specifically configured to query a preset spatial cue library for a spatial cue corresponding to the azimuth information, where the spatial cue library includes a plurality of correspondences; any of the correspondences includes azimuth information and a spatial cue corresponding to the azimuth information; the spatial cue includes a binaural cue and a monoaural cue; the binaural cue is used to reflect a change of voice in a horizontal direction, and includes an interaural level difference (ILD) and an interaural time difference (ITD); and the monoaural cue is used to reflect a change of the voice in a vertical direction. The processing unit 1802 is further specifically configured to: map the voice signal onto a first source signal corresponding to the first channel and a second source signal corresponding to the second channel; superpose the ITD onto the second source signal to obtain a superposed second source signal; superpose the ILD onto the first source signal to obtain a superposed first source signal; and generate a filter coefficient by using the monoaural cue, and separately perform filtering on the superposed first source signal and the superposed second source signal based on the filter coefficient, to obtain the first-channel voice signal and the second-channel voice signal.

In an optional embodiment, the voice call apparatus may further include a storage unit 1804. The processing unit 1802 and the storage unit 1804 are connected to each other through a line.

The storage unit 1804 may include one or more memories. The memories may be devices that are used by one or more components or circuits for storing a program or data.

The storage unit 1804 may exist independently and be connected, through a communications line, to the processing unit 1802 of the voice call apparatus. Alternatively, the storage unit 1804 may be integrated with the processing unit 1802.

The communications unit 1803 may be an input or output interface, a pin, a circuit, or the like. For example, the storage unit 1804 may store a computer executable instruction of a method of a radar or a target device, such that the processing unit 1802 can execute the method of the radar or target device in the above embodiments. The storage unit 1804 may be a register, a buffer, a RAM, or the like, and may be integrated with the processing unit 1802. The storage unit 1804 may be a ROM or another type of static storage device capable of storing static information and an instruction, and may be independent of the processing unit 1802.

Figure 19:
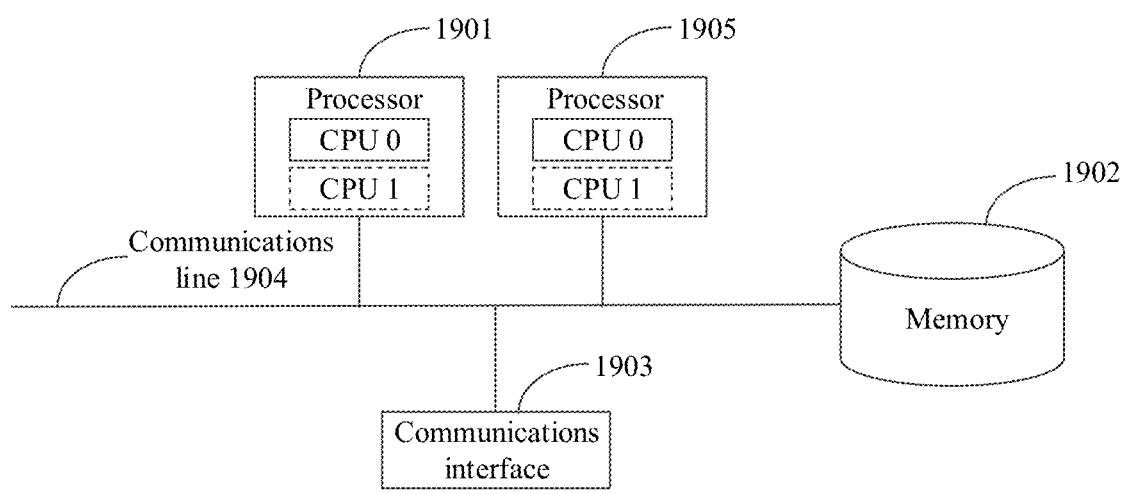
FIG. 19 is a schematic structural diagram of hardware of a control device according to an embodiment of this application.

FIG. 19 is a schematic structural diagram of hardware of a control device according to an embodiment of this application. As shown in FIG. 19, the control device includes a processor 1901, a communications line 1904, and at least one communications interface (a communications interface 1903 in FIG. 19 is used as an example for description).

The processor 1901 may be a general-purpose central processing unit (central processing unit, CPU), a microprocessor, an application-specific integrated circuit (application-specific integrated circuit, ASIC), or one or more integrated circuits configured to control execution of a program of the solution of this application.

The communications line 1904 may include a circuit for transmitting information between the above components.

The communications interface 1903 uses any apparatus such as a transceiver to communicate with another device or a communications network, such as an Ethernet or a wireless local area network (wireless local area network, WLAN).

Optionally, the control device may further include a memory 1902.

The memory 1902 may be a read-only memory (read-only memory, ROM) or another type of static storage device capable of storing static information and an instruction, a random access memory (random access memory, RAM) or another type of dynamic storage device capable of storing information and an instruction, an electrically erasable programmable read-only memory (electrically erasable programmable read-only memory; EEPROM), a compact disc read-only memory (compact disc read-only memory, CD-ROM) or another optical disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may exist independently and is connected to the processor through the communications line 1904. Alternatively, the memory may be integrated with the processor.

The memory 1902 is configured to store a computer executable instruction for performing the solution in this application, and the processor 1901 controls execution. The processor 1901 is configured to execute the computer executable instruction stored in the memory 1902, to implement the voice call method provided in the embodiments of this application.

Possibly, the computer executable instruction in this embodiment of this application may also be referred to as application program code. This is not specifically limited in this embodiment of this application.

In a specific implementation, in an embodiment, the processor 1901 may include one or more CPUs, for example, a CPU 0) and a CPU 1 in FIG. 19.

In a specific implementation, in an embodiment, the control device may include a plurality of processors, such as the processor 1901 and a processor 1905 in FIG. 19. Each of these processors may be a single-CPU (single-CPU) processor, or may be a multi-CPU (multi-CPU) processor. These processors herein may refer to one or more devices, circuits, and/or processing cores for processing data (such as computer program instructions).

Figure 20:
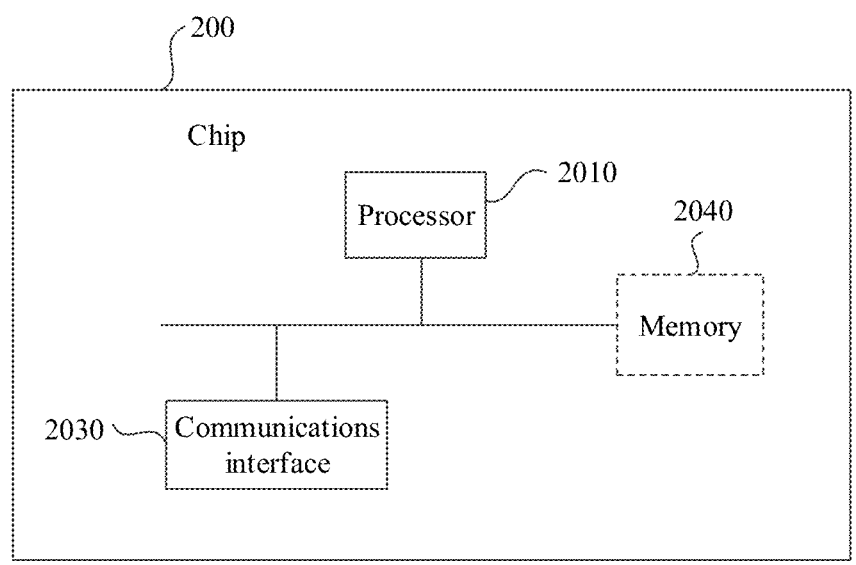
FIG. 20 is a schematic structural diagram of a chip according to an embodiment of this application.

For example. FIG. 20 is a schematic structural diagram of a chip according to an embodiment of this application. The chip 200 includes one or more processors 2020 and a communications interface 2030.

In some implementations, the memory 2040 stores the following elements: an executable module or a data structure, a subset thereof, or an extended set thereof.

In this embodiment of this application, the memory 2040 may include a read-only memory and a random access memory, and provide an instruction and data to the processor 2020. A part of the storage device 2040 may further include a non-volatile RAM (non-volatile random access memory, NVRAM).

In this embodiment of this application, the memory 2040, the communications interface 2030, and the memory 2040 are coupled together through a bus system. In addition to a data bus, the bus system may further include a power bus, a control bus, a status signal bus, and the like.

The method described in the above embodiments of this application may be applied to the processor 2020, or may be implemented by the processor 2020. The processor 2020 may be an integrated circuit chip having a signal processing capability. During implementation, the steps of the above method may be completed by hardware integrated logic circuits in the processor 2020 or instructions in a form of software. The above processor 2020 may be a general-purpose processor (for example, a microprocessor or a conventional processor), a digital signal processor (digital signal processor. DSP), an application-specific integrated circuit (application-specific integrated circuit, ASIC), a field-programmable gate array (field-programmable gate array, FPGA) or another programmable logic component, a discrete gate, a transistor logic component, or a discrete hardware component. The processor 2020 may implement or perform the methods, steps, and logical block diagrams that are disclosed in the embodiments of the present application.

The steps of the method disclosed in the embodiments of this application may be directly performed by a hardware decoding processor or performed by a combination of hardware and software modules in a decoding processor. The software module may be located in a mature storage medium in the art, such as a random access memory, a read-only memory, a programmable read-only memory, or an electrically erasable programmable read-only memory (electrically erasable programmable read-only memory. EEPROM). The storage medium is located in the memory 2040. The processor 2020 reads information in the memory 2040, and completes the steps of the above method in combination with hardware of the processor 2020.

In the above embodiment, the instruction stored by the memory and executed by the processor may be implemented in a form of a computer program product. The computer program product may be written into the memory in advance, or may be downloaded to and installed in the memory in a form of software.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line. DSL)) or wireless (for example, infrared, radio, and microwave) manner. The computer-readable storage medium may be any usable medium accessible by a computer, or a data storage device, such as a server or a data center, integrating one or more usable media. The usable medium may include a magnetic medium (for example, a floppy disk, a hard disk, or a magnetic tape), an optical medium (for example, a digital versatile disc (digital versatile disc, DVD)), a semiconductor medium (for example, a solid-state disk (solid-state disk, SSD)), or the like.

An embodiment of this application further provides a computer-readable storage medium. Some or all of the functions of the method described in the above embodiments may be implemented by software, hardware, firmware, or any combination thereof. The computer-readable medium may include a computer storage medium and a communications medium, and may further include any medium that enables a computer program to be transmitted from one place to another place. The storage medium may be any target medium accessible to a computer.

In a possible design, the computer-readable medium may include a compact disc read-only memory (compact disc read-only memory. CD-ROM), a RAM, a ROM, an EEPROM, or another optical memory. The computer-readable storage medium may include a magnetic disk memory or another magnetic storage device. In addition, any connection line may be appropriately referred to as a computer-readable medium. For example, if software is transmitted from a website, a server, or another remote source by using a coaxial cable, an optical fiber cable, a twisted pair, a DSL, or a wireless technology such as infrared, radio, or microwave, the coaxial cable, the optical fiber cable, the twisted pair, the DSL, or the wireless technology such as infrared, radio, or microwave is included in a definition of a medium. A disk and a disc used in this specification include a compact disc (CD), a laser disc, an optical disc, a digital versatile disc (digital versatile disc. DVD), a floppy disk, and a blue-ray disc. The magnetic disk generally duplicates data magnetically, while the compact disc generally duplicates data optically through laser.

The above combination should also be included in the protection scope of the computer-readable medium. The above descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A voice call method, applied to a voice call system, wherein the voice call system comprises a first terminal device, a second terminal device, and a first headphone connected to the first terminal device, and the method comprises:

displaying, by the first terminal device, a first interface, wherein the first interface is an interface used for calling the second terminal device, and comprises a first control;

receiving, by the first terminal device, a first operation of selecting the first control;

enabling, by the first terminal device, a first function in response to the first operation, wherein the first function is used to implement a positioning assist during a voice call;

sending, by the first terminal device, a first request to the second terminal device, wherein the first request is used for requesting location information of the second terminal device;

sending, by the second terminal device, a first message to the first terminal device, wherein the first message contains the location information of the second terminal device;

obtaining, by the first terminal device, azimuth information between the first terminal device and the second terminal device based on location information and orientation information of the first terminal device and the location information of the second terminal device;

when the azimuth information indicates that the second terminal device is located at a first side of the first terminal device, processing, by the first terminal device, a voice signal from the second terminal device based on the azimuth information and a spatial cue to obtain a first-channel voice signal and a second-channel voice signal, wherein the spatial cue is obtained from a preset spatial cue library based on a correspondence with the azimuth information;

sending, by the first terminal device, the first-channel voice signal and the second-channel voice signal to a first channel and a second channel of the first headphone, respectively, wherein the first headphone comprises a first earpiece and a second earpiece, the first earpiece corresponds to the first channel, and the second earpiece corresponds to the second channel; and playing, by the first headphone, the first-channel voice signal and the second-channel voice signal in the first channel and the second channel, respectively.

2. The method according to claim 1, wherein the first side corresponds to the first channel of the first headphone, and a signal strength of the first-channel voice signal is greater than that of the second-channel voice signal.

3. The method according to claim 2, wherein a time delay of the first-channel voice signal is less than that of the second-channel voice signal.

4. The method according to claim 2, wherein the processing, by the first terminal device, a voice signal from the second terminal device based on the azimuth information and a spatial cue to obtain a first-channel voice signal and a second-channel voice signal comprises:

querying, by the first terminal device, the preset spatial cue library for the spatial cue corresponding to the azimuth information, wherein the spatial cue library comprises a plurality of correspondences; any of the correspondences comprises azimuth information and a spatial cue corresponding to the azimuth information; the spatial cue comprises a binaural cue and a monoaural cue; the binaural cue is used to reflect a change of voice in a horizontal direction, and comprises an interaural level difference (ILD) and an interaural time difference (ITD); and the monoaural cue is used to reflect a change of the voice in a vertical direction;

mapping, by the first terminal device, the voice signal onto a first source signal corresponding to the first channel and a second source signal corresponding to the second channel;

superposing, by the first terminal device, the ITD onto the second source signal to obtain a superposed second source signal;

superposing, by the first terminal device, the ILD onto the first source signal to obtain a superposed first source signal; and generating, by the first terminal device, a filter coefficient by using the monoaural cue, and separately performing filtering on the superposed first source signal and the superposed second source signal based on the filter coefficient, to obtain the first-channel voice signal and the second-channel voice signal.

5. The method according to claim 1, wherein the first interface further displays a first pop-up window; and the first pop-up window displays, in a form of a list, the first control, a second control used for making a call, and a third control used for editing a number before calling the number.

6. The method according to claim 1, wherein the sending, by the second terminal device, a first message to the first terminal device comprises:

displaying, by the second terminal device, a second interface in response to the first request, wherein the second interface is an interface used for prompting a voice call, and comprises a fourth control; and sending, by the second terminal device, the first message to the first terminal device when the second terminal device receives, within a first time threshold, a second operation of triggering the fourth control.

7. The method according to claim 6, wherein the first message further comprises orientation information of the second terminal device, and the sending, by the second terminal device, a first message to the first terminal device comprises:

displaying, by the second terminal device, a third interface in response to the second operation, wherein the third interface is used to determine an initial azimuth of the second terminal device, and displays a compass used for indicating an azimuth;

receiving, by the second terminal device in the third interface, a third operation used for azimuth calibration; and sending, by the second terminal device, the first message to the first terminal device in response to the third operation.

8. The method according to claim 6, further comprising:
displaying, by the second terminal device, first prompt information, wherein the first prompt information is used to prompt an applicable range of the first function.

9. The method according to claim 1, wherein before the sending, by the first terminal device, a first request to the second terminal device, the method further comprises:

displaying, by the first terminal device, a fourth interface, wherein the fourth interface is an interface of a voice call, and comprises a fifth control;

receiving, by the first terminal device, a fourth operation of selecting the fifth control; and enabling, by the first terminal device, the first function in response to the fourth operation, wherein the first function is used to implement a positioning assist during a voice call.

10. The method according to claim 9, wherein the fourth interface further displays a sixth control used for recording, a seventh control used for voice on hold, the fifth control, an eighth control used for making a video call, a ninth control used for muting, and a tenth control used for viewing a contact.

11. The method according to claim 9, wherein the sending, by the second terminal device, a first message to the first terminal device comprises:

displaying, by the second terminal device, second prompt information in response to the first request, wherein the second prompt information comprises an eleventh control and a twelfth control; and sending, by the second terminal device, the first message to the first terminal device when the second terminal device receives, within a second time threshold, a fifth operation of triggering the eleventh control.

12. The method according to claim 1, wherein a voice call interface of the first terminal device further comprises a thirteenth control, and the method further comprises:
receiving, by the first terminal device, a sixth operation of triggering the thirteenth control; and
displaying, by the first terminal device, a map interface in the voice call interface in response to the sixth operation, wherein the map interface comprises locations of the first terminal device and the second terminal device, and a route from the first terminal device to the second terminal device.

13. A voice call method, wherein a first terminal device is connected to a first headphone, and the method comprises:
displaying, by the first terminal device, a first interface, wherein the first interface is an interface used for calling a second terminal device, and comprises a first control;
receiving, by the first terminal device, a first operation of selecting the first control;
enabling, by the first terminal device, a first function in response to the first operation, wherein the first function is used to implement a positioning assist during a voice call;
sending, by the first terminal device, a first request to the second terminal device, wherein the first request is used to request location information of the second terminal device;
receiving, by the first terminal device, a first message sent by the second terminal device, wherein the first message contains the location information of the second terminal device;
obtaining, by the first terminal device, azimuth information between the first terminal device and the second terminal device based on location information and orientation information of the first terminal device and the location information of the second terminal device;
when the azimuth information indicates that the second terminal device is located at a first side of the first terminal device, processing, by the first terminal device, a voice signal from the second terminal device based on the azimuth information and a spatial cue to obtain a first-channel voice signal and a second-channel voice signal, wherein the spatial cue is obtained from a preset spatial cue library based on a correspondence with the azimuth information;
sending, by the first terminal device, the first-channel voice signal and the second-channel voice signal to a first channel and a second channel of the first headphone, respectively, wherein the first headphone comprises a first earpiece and a second earpiece, the first earpiece corresponds to the first channel, and the second earpiece corresponds to the second channel; and
playing, by the first headphone, the first-channel voice signal and the second-channel voice signal in the first channel and the second channel, respectively.

14. The method according to claim 13, wherein before the sending, by the first terminal device, a first request to the second terminal device, the method further comprises:
displaying, by the first terminal device, a fourth interface, wherein the fourth interface is an interface of a voice call, and comprises a fifth control;
receiving, by the first terminal device, a fourth operation of selecting the fifth control; and enabling, by the first terminal device, the first function in response to the fourth operation, wherein the first function is used to implement a positioning assist during a voice call.

15. The method according to claim 13, wherein a voice call interface of the first terminal device further comprises a thirteenth control, and the method further comprises:
receiving, by the first terminal device, a sixth operation of triggering the thirteenth control; and
displaying, by the first terminal device, a map interface in the voice call interface in response to the sixth operation, wherein the map interface comprises locations of the first terminal device and the second terminal device, and a route from the first terminal device to the second terminal device.

16. The method according to claim 13, wherein the first side corresponds to the first channel of the first headphone, and the processing, by the first terminal device, a voice signal from the second terminal device based on the azimuth information and a spatial cue to obtain a first-channel voice signal and a second-channel voice signal comprises:
querying, by the first terminal device, the preset spatial cue library for the spatial cue corresponding to the azimuth information, wherein the spatial cue library comprises a plurality of correspondences; any of the correspondences comprises azimuth information and a spatial cue corresponding to the azimuth information; the spatial cue comprises a binaural cue and a monoaural cue; the binaural cue is used to reflect a change of voice in a horizontal direction, and comprises an interaural level difference (ILD) and an interaural time difference (ITD); and the monoaural cue is used to reflect a change of the voice in a vertical direction;
mapping, by the first terminal device, the voice signal onto a first source signal corresponding to the first channel and a second source signal corresponding to the second channel;
superposing, by the first terminal device, the ITD onto the second source signal to obtain a superposed second source signal;
superposing, by the first terminal device, the ILD onto the first source signal to obtain a superposed first source signal; and
generating, by the first terminal device, a filter coefficient by using the monoaural cue, and separately performing filtering on the superposed first source signal and the superposed second source signal based on the filter coefficient, to obtain the first-channel voice signal and the second-channel voice signal.

17. A first terminal device, comprising: a memory, a processor, and a computer program stored in the memory and executable on the processor, wherein when the processor executes the computer program, the first terminal device is enabled to perform a method, the method comprising:
connecting to a first headphone;
displaying a first interface, wherein the first interface is an interface used for calling a second terminal device, and comprises a first control;
receiving a first operation of selecting the first control;
enabling a first function in response to the first operation, wherein the first function is used to implement a positioning assist during a voice call;
sending a first request to the second terminal device, wherein the first request is used to request location information of the second terminal device;

receiving a first message sent by the second terminal device, wherein the first message contains the location information of the second terminal device;

obtaining azimuth information between the first terminal device and the second terminal device based on location information and orientation information of the first terminal device and the location information of the second terminal device;

when the azimuth information indicates that the second terminal device is located at a first side of the first terminal device, processing a voice signal from the second terminal device based on the azimuth information and a spatial cue to obtain a first-channel voice signal and a second-channel voice signal, wherein the spatial cue is obtained from a preset spatial cue library based on a correspondence with the azimuth information; and sending the first-channel voice signal and the second-channel voice signal to a first channel and a second channel of the first headphone, respectively, wherein the first headphone comprises a first earpiece and a second earpiece, the first earpiece corresponds to the first channel, and the second earpiece corresponds to the second channel.

18. The first terminal device according to claim 17, wherein the first side corresponds to the first channel of the first headphone, and a signal strength of the first-channel voice signal is greater than that of the second-channel voice signal.

19. The first terminal device according to claim 18, wherein a time delay of the first-channel voice signal is less than that of the second-channel voice signal.

20. The first terminal device according to claim 17, wherein the first interface further displays a first pop-up window; and the first pop-up window displays, in a form of a list, the first control, a second control used for making a call, and a third control used for editing a number before calling the number.

\* \* \* \* \*